(12) United States Patent
Cao et al.

(10) Patent No.: US 10,460,320 B1
(45) Date of Patent: Oct. 29, 2019

(54) FRAUD DETECTION IN HETEROGENEOUS INFORMATION NETWORKS

(71) Applicant: Electronic Arts Inc., Redwood City, CA (US)

(72) Inventors: Bokai Cao, Chicago, IL (US); Ming Mao, Palo Alto, CA (US); Siim Viidu, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 522 days.

(21) Appl. No.: 15/351,307

(22) Filed: Nov. 14, 2016

Related U.S. Application Data

(60) Provisional application No. 62/373,004, filed on Aug. 10, 2016.

(51) Int. Cl.
| | |
|---|---|
| *G08B 23/00* | (2006.01) |
| *G06F 12/16* | (2006.01) |
| *G06F 12/14* | (2006.01) |
| *G06F 11/00* | (2006.01) |
| *G06Q 20/40* | (2012.01) |
| *G06Q 30/00* | (2012.01) |
| *G06N 20/00* | (2019.01) |

(52) U.S. Cl.
CPC ......... *G06Q 20/4016* (2013.01); *G06N 20/00* (2019.01); *G06Q 30/0185* (2013.01)

(58) Field of Classification Search
CPC . G06Q 20/4016; G06Q 30/0185; G06N 20/00
USPC ....................................................... 726/25
See application file for complete search history.

(56) References Cited

U.S. PATENT DOCUMENTS

| | | | |
|---|---|---|---|
| 6,769,016 | B2 | 7/2004 | Rothwell et al. |
| 7,721,336 | B1 * | 5/2010 | Adjaoute ............... G06Q 20/04 |
| | | | 379/145 |
| 7,877,482 | B1 | 1/2011 | Ashcraft et al. |
| 7,974,849 | B1 | 7/2011 | Begole et al. |
| 8,370,389 | B1 | 2/2013 | Dotan |
| 8,589,174 | B2 | 11/2013 | Nelson et al. |
| 8,661,547 | B1 | 2/2014 | Kononov et al. |
| 8,794,508 | B1 | 8/2014 | Pascal |
| 8,881,266 | B2 | 11/2014 | Chow et al. |

(Continued)

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

(Continued)

*Primary Examiner* — Monjur Rahim
(74) *Attorney, Agent, or Firm* — Knobbe, Martens, Olson & Bear, LLP

(57) ABSTRACT

Heterogeneous information networks can be used to detect whether a new transaction is fraudulent. Metapaths are determined based on the heterogeneous information. The transactions can be downsized. For each metapath, training transaction data and test transaction data be used to compute a feature vector "z." A fraud detection system can use the features to generate a fraud detection model. The fraud detection model can be iteratively refined using machine learning. The fraud detection models can then be applied to new transactions to determine a risk score of the new transaction.

20 Claims, 17 Drawing Sheets

(56) References Cited

U.S. PATENT DOCUMENTS

| | | | |
|---|---|---|---|
| 9,112,895 | B1 | 8/2015 | Lin |
| 9,231,936 | B1 | 1/2016 | Wang et al. |
| 9,517,402 | B1* | 12/2016 | Vogel ............... G06F 21/316 |
| 9,529,777 | B2 | 12/2016 | Tjew et al. |
| 9,992,018 | B1* | 6/2018 | Tjew ............... H04L 9/0861 |
| 10,193,772 | B1 | 1/2019 | Tjew et al. |
| 10,204,374 | B1* | 2/2019 | Holan ............... G06Q 30/0637 |
| 2002/0133721 | A1* | 9/2002 | Adjaoute ............. G06Q 20/04 726/23 |
| 2002/0165838 | A1 | 11/2002 | Vetter |
| 2004/0039630 | A1 | 2/2004 | Begole et al. |
| 2005/0014559 | A1 | 1/2005 | Mattice et al. |
| 2005/0091524 | A1* | 4/2005 | Abe ................. G06F 21/6245 726/26 |
| 2005/0108384 | A1 | 5/2005 | Lambert et al. |
| 2006/0036727 | A1 | 2/2006 | Kurapati et al. |
| 2006/0093142 | A1 | 5/2006 | Schneier et al. |
| 2007/0043851 | A1 | 2/2007 | Yellamraju et al. |
| 2007/0111794 | A1 | 5/2007 | Hogan et al. |
| 2007/0121596 | A1 | 5/2007 | Kurapati et al. |
| 2007/0266394 | A1 | 11/2007 | Odent et al. |
| 2008/0059474 | A1* | 3/2008 | Lim ................. G06F 21/604 |
| 2008/0065994 | A1 | 3/2008 | Wang et al. |
| 2008/0209544 | A1 | 8/2008 | Kempka |
| 2008/0310312 | A1 | 12/2008 | Acharya et al. |
| 2009/0054123 | A1 | 2/2009 | Mityagin et al. |
| 2009/0143144 | A1 | 6/2009 | Schluessler et al. |
| 2009/0164788 | A1* | 6/2009 | Cho ................. H04L 63/061 713/175 |
| 2009/0219895 | A1 | 9/2009 | Wu |
| 2009/0235226 | A1 | 9/2009 | Murthy et al. |
| 2010/0162405 | A1 | 6/2010 | Cook et al. |
| 2011/0012603 | A1 | 1/2011 | Bose et al. |
| 2011/0167269 | A1* | 7/2011 | Baykal ............... H04L 63/061 713/169 |
| 2012/0036250 | A1 | 2/2012 | Vaswani et al. |
| 2012/0047578 | A1 | 2/2012 | Lee et al. |
| 2012/0093370 | A1* | 4/2012 | Ding ................. G06K 9/00771 382/106 |
| 2012/0137367 | A1 | 5/2012 | Dupont et al. |
| 2013/0072306 | A1 | 3/2013 | Parnprome |
| 2013/0296039 | A1 | 11/2013 | Engineer et al. |
| 2013/0311977 | A1 | 11/2013 | Nieminen et al. |
| 2015/0106927 | A1 | 4/2015 | Ferragut et al. |
| 2015/0238866 | A1 | 8/2015 | Khabazian |
| 2015/0341379 | A1 | 11/2015 | Lefebvre et al. |
| 2016/0110528 | A1 | 4/2016 | Gupta et al. |
| 2016/0142435 | A1 | 5/2016 | Bernstein et al. |
| 2016/0191654 | A1 | 6/2016 | Healey et al. |
| 2016/0217022 | A1 | 7/2016 | Velipasaoglu et al. |
| 2016/0342963 | A1* | 11/2016 | Zoldi ................. G06N 7/005 |
| 2016/0359870 | A1 | 12/2016 | Gu et al. |
| 2017/0060656 | A1 | 3/2017 | Bhattacharya et al. |
| 2017/0076217 | A1 | 3/2017 | Krumm et al. |
| 2017/0098067 | A1 | 4/2017 | Paluri et al. |
| 2017/0111378 | A1 | 4/2017 | Caffrey |
| 2017/0134415 | A1 | 5/2017 | Muddu et al. |
| 2017/0223036 | A1 | 8/2017 | Muddu et al. |

OTHER PUBLICATIONS

Ward, Mark, "Warcraft Game Maker in Spying Row", BBC News, published Oct. 31, 2005, retrieved Aug. 14, 2015, 1 pg.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.

Bokai Cao, Francine Chen, Dhiraj Joshi, and Philip S Yu. "Inferring crowd-sourced venues for tweets." IEEE Big Data, pp. 639-648. In IEEE, 2015.

Bokai Cao, Xiangnan Kong, and Philip S Yu. "Collective prediction of multiple types of links in heterogeneous information networks." In ICDM, pp. 50-59. In IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

William Eberle and Lawrence Holder. "Discovering structural anomalies in graph-based data." In CDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason Hd Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shicliang Yang. "Catchsync: catching synchronized behavior in large directed graphs." In KDD, pp. 941-950. ACM, 2014.

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

(56) References Cited

OTHER PUBLICATIONS

Yizhou Sun, Jiawei Han, Xifeng Yan, Philip S Yu, and Tianyi Wu. "PathSim: Meta path-based top-K similarity search in heterogeneous information networks." In VLDB, 2011.
Yizhou Sun, Yintao Yu, and Jiawei Han. "Ranking-based clustering of heterogeneous information networks with star network schema." In KDD, pp. 797-806. ACM, 2009.
Baoning Wu, Vinay Goel, and Brian D Davison. "Propagating trust and distrust to demote web spam." MTW, 190, 2006.

* cited by examiner

| | Meta-path | P-value |
|---|---|---|
| 501 | transaction $\xrightarrow{byBilling}$ billing $\xrightarrow{billingIP}$ IP $\xrightarrow{billingIP^{-1}}$ billing $\xrightarrow{byBilling^{-1}}$ transaction | 4.673578E-52 |
| 502 | transaction $\xrightarrow{tranIP}$ IP $\xrightarrow{tranIP^{-1}}$ transaction | 2.803312E-51 |
| 503 | transaction $\xrightarrow{byBilling}$ billing $\xrightarrow{byBilling^{-1}}$ transaction | 3.802802E-51 |
| 504 | transaction $\xrightarrow{byUser}$ user $\xrightarrow{byUser^{-1}}$ transaction | 2.548976E-50 |
| 505 | transaction $\xrightarrow{tranIP}$ IP $\xrightarrow{billingIP^{-1}}$ billing $\xrightarrow{byBilling^{-1}}$ transaction | 2.849650E-44 |
| 506 | transaction $\xrightarrow{byBilling}$ billing $\xrightarrow{billingIP}$ IP $\xrightarrow{tranIP^{-1}}$ transaction | 4.221229E-40 |
| 507 | transaction $\xrightarrow{containsItem}$ item $\xrightarrow{containsItem^{-1}}$ transaction | 1.305956E-29 |
| 508 | transaction $\xrightarrow{containsItem}$ item $\xrightarrow{isTitle}$ title $\xrightarrow{isTitle^{-1}}$ item $\xrightarrow{containsItem^{-1}}$ transaction | 8.136685E-31 |
| 509 | transaction $\xrightarrow{fromSource}$ source $\xrightarrow{fromSource^{-1}}$ transaction | 1.683313E-29 |

FIG. 5

Pesudo-Code

```
Input: G: a heterogeneous information network,
   X: a feature matrix, y[train]: labels of
   training instances, A: a base classifier
Output: y[test]: labels of test instances
 1: /* make all link types downsizing */
 2: for E^k=<V^i,V^j>∈ E do
 3:    if |V^i|<|V^j| then
 4:       E^k=<V^j,V^i>, A^k=A^{kT}
 5:    end if
 6: end for
 7: /* explore downsizing meta-paths from transac-
    tion nodes */
 8: p=q=0, paths[0]=I_n, traces[0]=[1]
 9: while p≤q do
10:    for E^k=<V^x,V^j>∈ E do
11:       if traces[p][end]=i then
12:          q++, paths[q]=paths[p]×A^k,
             traces[q]=[traces[p],j]
13:       end if
14:    end for
15:    p++
16: end while
17: /* collective prediction */
18: f=A(X[train,:],y[train])
19: y[test]=f(X[test,:])
20: repeat
21:    c=0
22:    for P_1=paths[i]∈paths do
23:       for P_2=paths[j]∈paths do
24:          if traces[i][end]=traces[j][end] then
25:             c++, compute meta-path based features
                z^c by Eq. (5)
26:          end if
27:       end for
28:    end for
29:    X'=[X,z^1,···,z^c]
30:    f=A(X'[train,:],y[train])
31:    y[test]=f(X'[test,:])
32: until convergence
```

FIG. 13

FRAUD DETECTION IN HETEROGENEOUS INFORMATION NETWORKS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Patent Application No. 62/373,004, filed on Aug. 10, 2016, the disclosure of which is hereby incorporated by reference in its entirety for all purposes.

BACKGROUND

Field of the Disclosure

The disclosure relates to multiple technical fields including artificial intelligence, machine learning, computer security, fraud detection, improving computation speeds, managing computer memory use, and heterogeneous networks.

Description of the Related Art

Video games are accessible in online environments where users can conduct transactions with video game servers and marketplace systems for video games, virtual goods, and services, among other things. The transactions can occur within a video game application or in a separate marketplace. Fraudulent transactions can be a very difficult and costly problem. Detection of fraudulent transactions has attracted many research efforts. Some work focuses on detecting and identifying fraudulent transactions after the transaction has been completed. In which case, the transaction needs to be reversed. This can be a time intensive and costly process.

SUMMARY OF THE DISCLOSURE

The systems, methods, and devices of this disclosure each have several innovative aspects, no single one of which is solely responsible for the all of the desirable attributes disclosed herein.

In some embodiments, a fraud detection computing system, the system comprising: a fraud detection data store configured to store a fraud detection model generated based at least in part on a metapath including a plurality of heterogeneous data nodes associated with transaction data and also based at least in part on a feature vector indicative of chances that a plurality of transactions were fraudulent; and a fraud detection server including one or more processors in electronic communication with a transaction processing system and with the fraud detection data store; wherein the fraud detection computing system is configured to: access transaction data for an electronic transaction from the transaction processing system, wherein the electronic transaction comprises transaction data including a transaction identifier and heterogeneous data values associated with the plurality of heterogeneous data nodes; during processing of an electronic transaction, analyze the transaction data using the fraud detection model; determine a fraud detection indicator based at least in part on an output of the fraud detection model, the fraud detection indicator indicating a chance that the electronic transaction is fraudulent; and based on a determination that the fraud detection indicator exceeds a fraud detection threshold, generate instructions for the transaction processing system to cancel the electronic transaction; and provide the instructions to cancel the electronic transaction to the transaction processing system before completion of the electronic transaction.

In some embodiments, a computer-implemented method for stopping fraudulent electronic transactions, the method comprising: under control of a computing device comprising a hardware processor configured to execute software instructions: accessing, by a fraud detection server, data for an electronic transaction from a transaction processing system, wherein the electronic transaction comprises transaction data including a transaction identifier and data values; during processing of the electronic transaction, analyzing the transaction data for the electronic transaction using a fraud detection model, wherein the fraud detection model is generated based at least in part on a metapath comprising links between heterogeneous data nodes and a feature vector determined based, at least in part, on a metapath and on a plurality of historical transaction records; determining a fraud detection indicator based, at least in part, on an output of the fraud detection model; and based on a determination that the fraud detection indicator exceeds a fraud detection threshold, generating instructions for the transaction processing system to cancel the electronic transaction; and providing the instructions to cancel the electronic transaction to the transaction processing system before completion of the electronic transaction.

In some embodiments, a non-transitory computer readable medium comprising computer-executable instructions for fraud detection that, when executed by a computer, causes the computer to implement a method comprising: accessing, by a fraud detection server, data for an electronic transaction from a transaction processing system, wherein the electronic transaction comprises transaction data including a transaction identifier and data values associated with a plurality of heterogeneous data nodes; during processing of the electronic transaction, analyzing the transaction data for the electronic transaction using a fraud detection model, wherein the fraud detection model is generated based at least in part on a metapath comprising links between a plurality of heterogeneous data nodes and also on a feature vector determined based, at least in part, on the metapath and on a plurality of historical transaction records; determining a fraud detection indicator based at least in part on an output of the fraud detection model; and based on a determination that the fraud detection indicator exceeds a fraud detection threshold, generating instructions for the transaction processing system to cancel the electronic transaction; and providing the instructions to cancel the electronic transaction to the transaction processing system before completion of the electronic transaction.

For purposes of summarizing the disclosure, certain aspects, advantages, and novel features have been described herein. It is to be understood that not necessarily all such aspects, advantages, and novel features are achieved in accordance with any particular embodiment. Thus, one or more aspects, advantages, and novel features as taught herein may be achieved without necessarily achieving other aspects, advantages, and novel features as can be taught or suggested herein.

BRIEF DESCRIPTION OF THE DRAWINGS

FIG. 5 illustrates an embodiment of a table of nine example metapaths.

FIG. 13 illustrates an embodiment of an example pseudocode for generating a fraud detection model.

DETAILED DESCRIPTION OF CERTAIN EMBODIMENTS

Introduction

Figure 4:
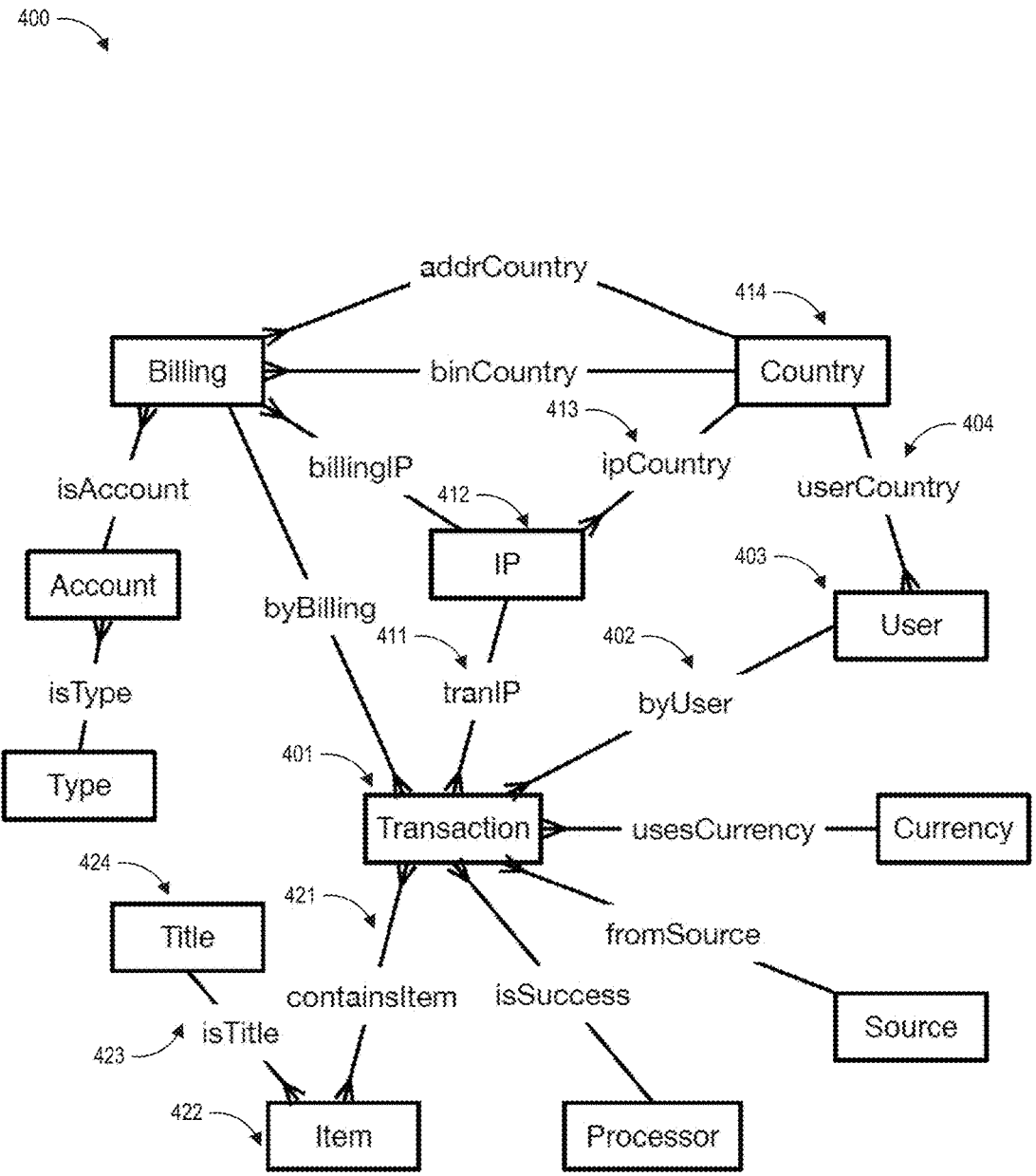
FIG. 4 illustrates an embodiment of a directed graph indicating the network scheme used for a heterogeneous information network for a digital gaming platform.

A fraud detection system can use heterogeneous information networks to detect fraud. Heterogeneous information networks can include data that can be categorized as different types of nodes (for example, a transaction, an IP address, a user). "Links" or "edges" can indicate sematic relationships between different types of nodes. FIG. 4 illustrates an embodiment of a directed graph showing example types of nodes and links related to transactions. The fraud detection system can determine metapaths based on the heterogeneous information received from the heterogeneous information networks. A transaction-related metapath can include nodes and links related to the transaction (such as, for example, the illustrative metapaths shown in FIG. 5). For each metapath, training transaction data (for example, historical transaction data including a subset of transactions marked as fraudulent) can be used to compute a feature vector "z." A feature vector can be calculated for a metapath to help determine whether elements of a particular instance of the metapath are useful for detecting fraud (such as, for example, a transaction by a particular billing entity having a particular billing IP address). A model generation system can use the feature vectors to generate a fraud detection model. The fraud detection model can be used to calculate a score indicative of the risk of a new transaction.

Heterogeneous information networks and metapaths allow linked transactions to be compactly presented in various semantic representations. Label information associated with a transaction can provide an indication of the results on an analysis of the transaction (such as, for example, fraudulent, normal, a risk score, and/or other indication of the analysis). The statistics of label information of linked transactions can be aggregated to help distinguish potentially fraudulent transactions from normal ones. By using linked transactions in the analysis, the fraud detection system can help to detect a fraudulent transaction even if the fraudulent transaction would appear to be normal when examined independently.

In some embodiments, machine learning techniques and artificial intelligence can improve the fraud detection model. The models can be iteratively trained using machine learning techniques to improve accuracy. Fraudulent transactions can be identified in a semi-supervised manner by utilizing test transactions and updating the fraud detection models.

In some embodiments, metapaths can be separated into a plurality of downsized metapaths. For purposes of computation, a metapath can be represented as a matrix. Efficiency of a mathematical operation can be based on the number of clock cycles used to perform a mathematical operation, and the amount of memory allocated to the operation. For example, calculating "5×5" can be processed faster than "5×5×5" and would use memory for two integers instead of three. However, this application discloses the counter-intuitive result that, for some computer processors and memory systems, large scale computations on two matrixes (for example, the matrixes $P_1$ and $P_2$ as used in equation $P1 \times (D_2 \times P_2^T \times y)$) can be computed faster than large scale computations including a single matrix (for example, the single matrix P as used in the equation D×P×y) and can use less memory. Accordingly, the efficiencies of computation can result for some particular processors, and computer instructions can be structured for processing large amounts of transaction data at improved speeds.

In some embodiments implemented in computer systems, memory is used to store data that is being processed. Very large amounts of memory may be needed to represent data when very large amounts of transactions are being processed. Exceeding memory requirements can cause memory misses (including multi-level memory misses) that greatly reduce computational speed or out-of-memory errors that can cause the program to terminate or produce incorrect results. The amount of memory used can be a quadratic function of the number of transactions being processed. For example, processing 1 transaction may use 1 unit of memory, but processing 1 million transactions may use (1 million)$^2$=1,000,000,000,000=1 trillion units of memory. Running out of memory and slow computation speeds due to cache misses quickly become real problems when computers are used to process increasingly large numbers of transactions. In some embodiments, a computer system can be implemented such that the amount of memory used increases linearly with the number of transactions. For example, the linear number may be five such that processing one transaction uses five units of memory, and processing one million transactions uses five million units of memory. Accordingly, at least some computer-specific problems associated with running out of memory (for example, slower processing due to cache misses, program stopping due to running out of memory, overriding previous values when memory runs out and rolls over thereby causing incorrect calculations) that have no human or mental analogues are addressed.

In some embodiments, the fraud detection techniques can be applied to the processing of transactions in a digital gaming platform. For example, purchases of video games, virtual currency, items, expansion packs, trades, and so forth can be evaluated using the fraud detection model to determine if the transaction is fraudulent. In some embodiments, the fraud detection models can compute the risk of fraud with over 93% accuracy. The fraud detection model can be used to compute the risk of fraud very quickly, for example, in less than a second, or within a few milliseconds, even when evaluating a new transaction against a voluminous set of data including all transactions from the past 7, 30, or 90 days and all transactions made by a particular user. This can include data from thousands of transactions (or more)— more data than a person could possibly process in any reasonable amount of time. The system can evaluate the risk of fraud during processing of the transaction, and if the risk is too high, then the system can deny the transaction before the transaction is electronically completed. In some embodiments, the system can construct a heterogeneous information network of over 400,000 nodes of 12 different types and over 1,500,000 links of 15 different types, compute metapaths in less than a second, and evaluate the fraud risk of a transaction using a model in approximately a second or less. By evaluating the risk of fraud during the transaction, the system can approve or deny a transaction before the transaction electronically completes, thereby helping to accurately process transactions without making transaction initiators wait for long periods of time.

Parts of the disclosure provide embodiments relating to a digital gaming platform to aid the understanding of the principles and teachings. However, it should be recognized that the principles and teachings disclosed herein can be applied to any field where there is a risk of fraud. Such fields include finance, retail, banking, application processing, computer security, network security, authentication, and the like.

For purposes of providing an introduction, certain aspects, advantages, and novel features have been introduced. It is to be understood that not necessarily all such aspects, advantages, and novel features of the introduction are achieved in accordance with any particular embodiment. Thus, one or more aspects, advantages, and novel features may be achieved without necessarily achieving the other aspects, advantages, and novel features introduced so far. It is also to be understood that not necessarily all aspects, advantages, and novel features have been disclosed in the introduction.

Fraud Detection System Operation

Figure 1:
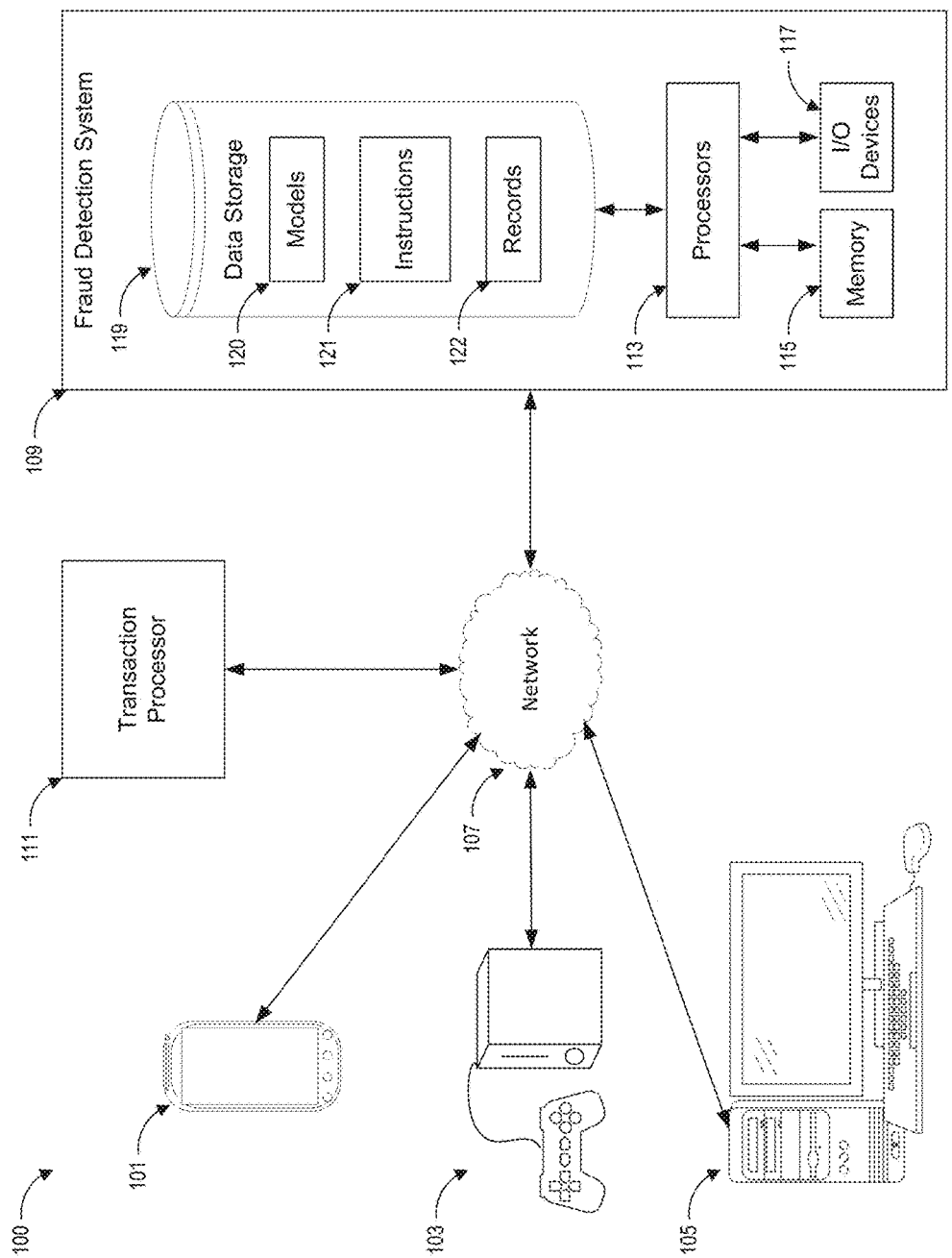
FIG. 1 illustrates an embodiment of a system for processing a transaction to detect fraud.

FIG. 1 shows an example system 100 for processing a transaction to detect fraud. The system can include transaction generators such as smartphones 101, consoles 103, or computers 105. The system also includes a network 107, a transaction processor 111, and a fraud detection system 109. The fraud detection system can include one or more processors 113, memory 115, input and output devices 117, and data storage devices 119. The data storage devices 119 can store data about models 120, model generation instructions 121, and records 123.

The fraud detection system 109 can be used as part of a digital gaming platform to detect fraudulent transactions 109. The digital gaming platform can allow transactions to be made over a network 107, such as the Internet, by individual users through a variety of digital gaming devices, such as smartphones 101, consoles 103, or computers 105.

A transaction (for example, a request to buy a game or in-game item) can be made by a user and sent to both the fraud detection system 109 and the transaction processor 111. In some embodiments, the transaction processor 111 can be part of the digital gaming platform (for example, the gaming platform may process the transaction) and communicate locally with the fraud detection system 109, or the transaction processor 111 can be a $3^{rd}$ party transaction processor (for example, a credit card company) that communicates with the fraud detection system 109 over the network 107. The fraud detection system 109 can analyze the transaction request to determine whether it is fraudulent before the transaction processing is completed. If the fraud detection system 109 determines that the transaction is likely fraudulent, the fraud detection system can prevent the transaction from completing. This can include the fraud detection system 109 sending an approval or denial instruction to the transaction processor 111.

To determine if a transaction is fraudulent, the fraud detection system 109 can use a fraud detection model 121. The fraud detection system can use previous records 122 to generate one or more fraud detection models 121 according to instructions 121 (such as for example, metapath generation instructions 206, feature calculation instructions 207, model generation instructions 208). The generated data about models 120 can be stored in data storage 119 and used to evaluate new transactions. The processors 113 can be configured to execute computer readable instructions stored in memory 115 to execute various aspects of the fraud detection system. For example, processors and memory 115 can be used in the generation of models and processing of transactions. Input and output devices 117 can be used, for example, to receive an input (such as training labels) and to generate outputs (for example, an alert, or notification that a transaction is fraudulent).

Figure 12:
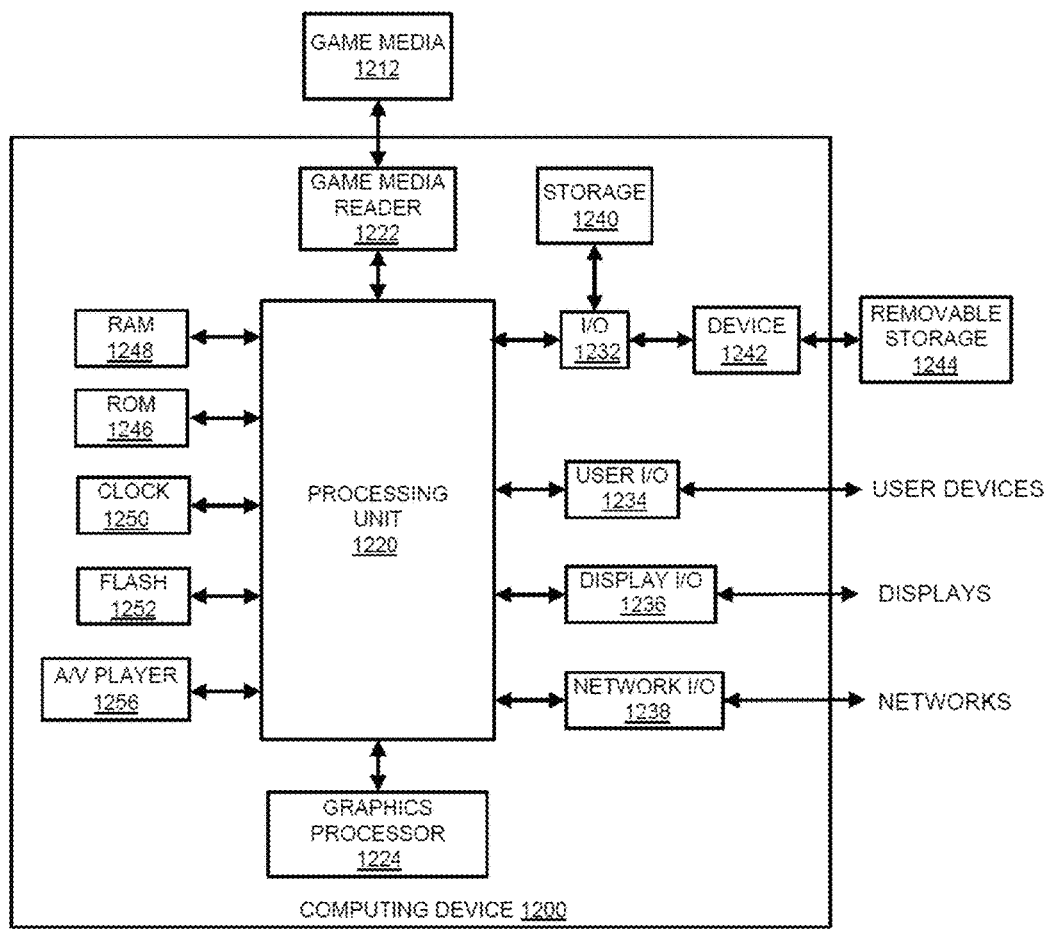
FIG. 12 illustrates an embodiment of a computing device according to the present disclosure.

The smartphones 101, consoles 103, computers 105, or fraud detection system 109 can be implemented in a computing device. An example of a computing device according to the present disclosure is illustrated in FIG. 12, discussed further below.

Model Generation System

Figure 2:
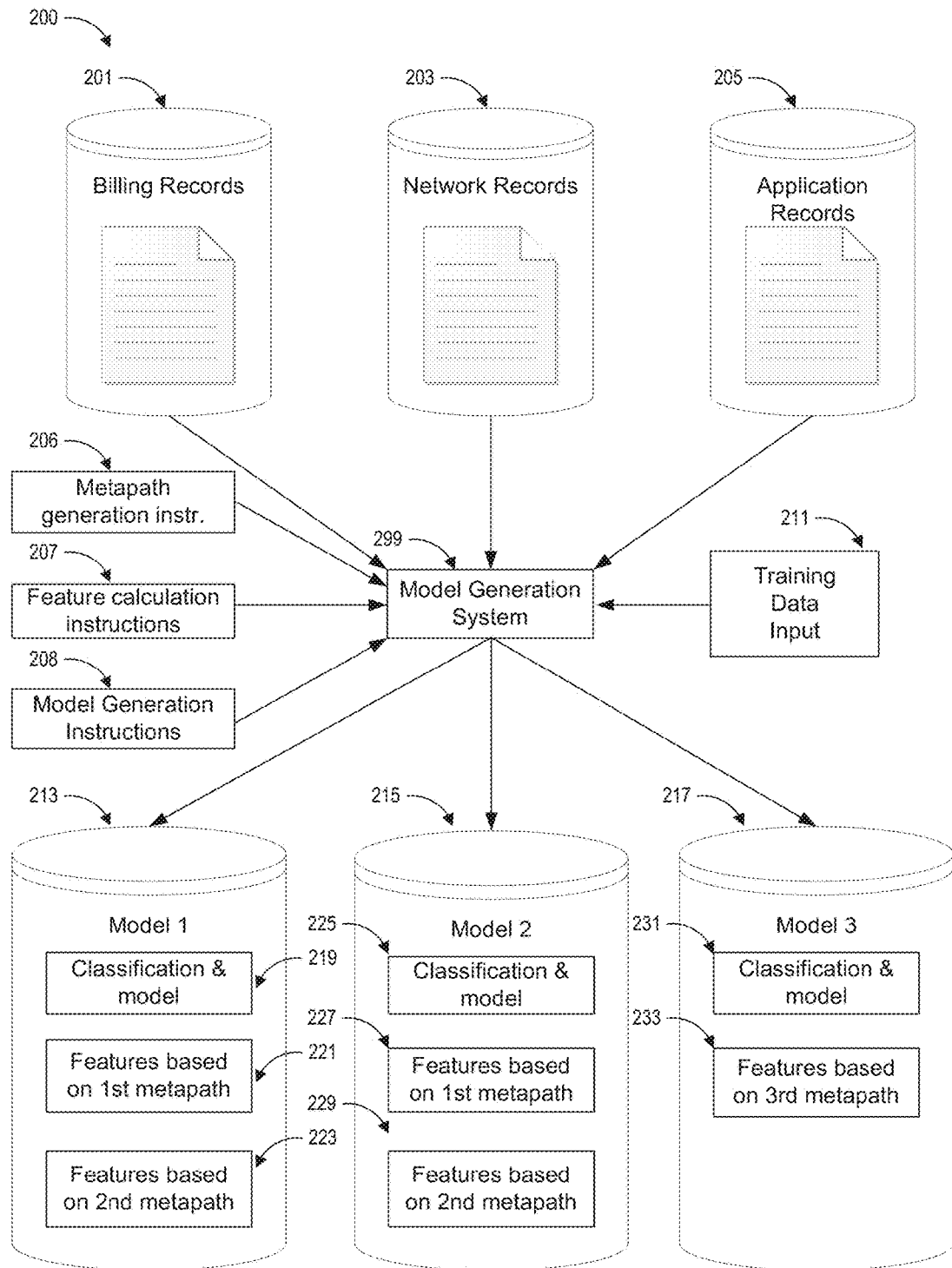
FIG. 2 illustrates an embodiment of a system for generating models.

FIG. 2 shows an example system 200 for generating models. The system includes a plurality of record data such as billing records 201, network records 203, application records 205, and the like. The system also includes metapath generation instructions 206, feature calculation instructions 207, model generation instructions 208, one or more processors 113, and training data 211. Models 213, 215, 217 can be generated. In some embodiments, the models 213, 215, 217 can be predictive functions. In some embodiments, each model can include data such as a classification and model data 219, 225, 231 (for example, linear regression model data), features based on a first metapath 221, 227, features based on a second metapath 223, 229, and/or features based on a third metapath 233. In some embodiments, features based on the first metapath 221 can be the same as features based on the first metapath 227, and the features based on the metapath 221, 227 can be stored in a single memory location but used for a plurality of different models. In some embodiments, features based on the first metapath 221 and 227 can be different and stored in different memory locations.

A variety of records can be used as the basis for generating models and developing metapaths. A record can include any type of data related to a transaction (for example, as shown in FIG. 4). For example, billing records 201 can include transaction identifiers, transaction amounts, currency used, billing addresses, and the like. Network records 203 can include information identifying IP addresses associated with user names. Application records 205 can include information identifying application sources through which transactions were made, names of items that were purchased, and the like. The records can be collected from a plurality of databases, including other databases and logs (not shown). In some embodiments, the record material can be collected from a single transaction record database.

A model generation system 299 can generate one or more models 213, 215, 217 according to instructions 206, 207, 208 by processing the records 201, 203, 205 and the training data 211. The instructions can be stored in a memory, such as memory 115 of FIG. 1.

The model generation system 299 can use metapath generation instructions 206 to process the records to determine metapaths (such as, for example, metapaths shown in FIG. 5), and in some embodiments, compute downsized metapaths. Examples of metapath generation instructions 206 can include breadth-first searches and depth-first searches. In some embodiments, one metapath can be determined. In some embodiments, a plurality of metapaths can be determined. As an example, metapath 502 shown in FIG. 5 is a metapath from a transaction to IP address associated with a transaction and back to the initial transaction. In some embodiments, the metapath generation instructions can include instructions to downsize metapaths.

The model generation system 299 can use feature calculation instructions to calculate metapath-based features for each metapath 221, 223, 227, 229, 233 based, at least in part, on the record data for each respective metapath and also based on the training data 211. This can include identifying instances of record data that falls within each metapath. With additional reference to FIG. 5, an illustrative example of a metapath 502 is illustrated. A first instance of metapath 502 is: transaction 001 $\xrightarrow{transIP}$ IP address 10.10.10.10 $\xrightarrow{transIP'}$ transaction 001; and a second instance of metapath 502 is: transaction 002 $\xrightarrow{transIP}$ IP address 2.2.2.2 $\xrightarrow{transIP'}$ transaction 002.

The model generation system 299 can use training data to help generate models, such as models 219, 225, or 231. The training data 211 can provide transactions that are known to be fraudulent. The model generation system 299 can determine the metapath-based features "z" based, at least in part, on the training data, the metapaths, and the instructions. Each metapath-based feature can associate an indication of risk with an instance of a metapath based feature. For example, it might be indicated that the transaction 002 was a fraudulent transaction, therefore, the computed metapath 502 based feature might indicate that transaction 002 associated with transaction IP address 2.2.2.2 which is associated with transaction 002 has a feature value of 0.7. The calculation of the features is discussed in further detail in later sections of this disclosure. The feature calculation instructions can include instructions to perform the calculations based on records for different time periods, and to periodically update the calculations (for example, daily).

The model generation instructions 207 can include instructions to generate models based on the features 211, 223, 227, 229, 233. The model generation system can generate a model (such as models 219, 225, or 231) using features 211, 223, 227, 229, 233. The model generation instructions can include iteratively training the models until the results from subsequent models converge with results from previous models.

Different embodiments can use different numbers of models that are based on records from different periods of time and use different metapaths or different numbers of metapaths. In some embodiments, a first model 213 can include features based on a first metapath 221 and features based on a different metapath 223. Records used in calculating the features for the first model 213 can include records spanning a first time period (for example, the past 7 days). A second model 215 can include features based on a first metapath 227 and features based on a different metapath 229. Records used in calculating the features for the second model 215 can include records spanning a second time period (for example, the past 30 days). A third model 217 can include features based on a third metapath 233. Records used in calculating the features for the third model 233 can include all records relating to a particular username.

Figure 3:
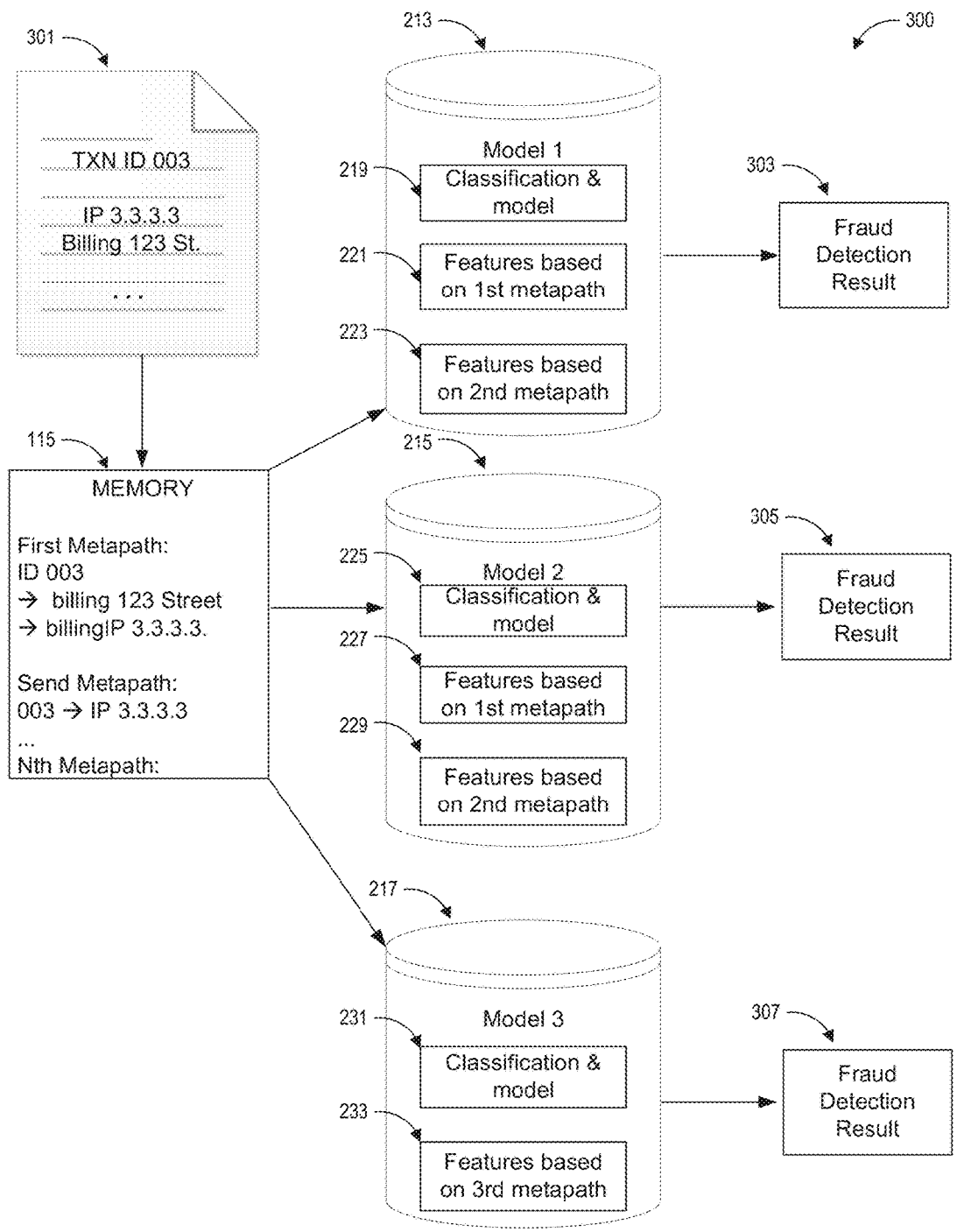
FIG. 3 illustrates an embodiment of a fraud detection system for using models to detect fraud.

FIG. 3 shows an example fraud detection system 300 for using models to detect fraud. A new transaction 301 can be received by the fraud detection system. Based on defined metapaths, the fraud detection system can process the data related to the transaction 301 in order to determine instances of the metapaths related to the new transaction and store the metapaths related to the new transaction into memory, such as memory 115. A computer can evaluate the instances of the metapaths related to the new transaction using the one or more models 213, 215, 217 and generate fraud detection results 303, 305, 307. In some embodiments, the fraud detection results 303, 305, 307 can then be analyzed and processed (for example, using a weighted average) to generate a final fraud detection result.

In some embodiments, one metapath-based feature of the new transaction is run through one model. In some embodiments, a plurality of metapath-based features of the new transaction is run through one model. In some embodiments, one metapath-based feature of the new transaction is run through a plurality of models. In some embodiments, a plurality of metapath-based features of the new transaction is run through each of a plurality of models. In some embodiments, where a plurality of models generate a plurality of intermediary fraud detection results, a final fraud detection result can be calculated based on the intermediary fraud detection results (for example, using a weighted average).

In some embodiments, the fraud detection results 303, 305, 307 are numbers that indicate a risk that the new transaction 301 is fraudulent (for example, a number from 0 to 1, where 1 indicates a calculated 100% chance that the transaction is fraudulent). Accordingly, where one of (or where a combination of) the fraud detection results 303, 305, 307 exceed a threshold (for example, greater than 0.5, greater than 0.7, greater than 0.95), the transaction can be denied. In such a case, the fraud detection system can alert a user (for example, an account supervisor, a transaction processor, credit bureau, legal authorities) that a fraudulent transaction is being attempted. When the fraud detection result is within a threshold, then the transaction can be approved or allowed to complete.

Embodiments of Data Structures

FIGS. 4 through 6 provide embodiments of data and organizational structures to aid in the understanding of concepts disclosed herein. FIG. 4 illustrates an example embodiment of a directed graph 400 indicating the network scheme used for a heterogeneous information network for a digital gaming platform. The directed graph 400 includes a plurality of types of nodes in boxes, such as the transaction 401, a user node 403, an IP node 412, a country node 414, an item node 422, and a title node 424. The directed graph 400 also shows a plurality of different types of links (or "edges") illustrated as lines between nodes with semantic labels, such as link byUser 402, userCountry 404, tranIP 411, ipCountry 413, containsItem 421, and isTitle 423.

The heterogeneous information network can be constructed as a directed graph by processing records from databases. Data for the types of nodes can be extracted from the records. For example, each transaction record may include information such as an IP address associated with the transaction, a user associated with the transaction, an item purchased in the transaction, and the like. Each of these categories can be represented as a type of node in the directed graph 400. For example, a record may include information about a transaction, and the record will have a transaction ID number. Transaction IDs can be a type of node 401 in the directed graph 400.

The relationships between types of nodes can be indicated with certain types of links. In the directed graph 400, each link can be assigned a semantic label to indicate its relationship between two types of nodes. For example, the "tranIP" link between a transaction and an IP address indicates that a transaction was executed through the particular IP address.

The directed graph 400 shows information received from a heterogeneous information network, which has multiple types of nodes or multiple types of links. In the illustrated embodiment, transactions are the target instances on which fraud decisions can be made. An instance of a directed graph can include instances of transaction IDs as nodes where transaction IDs are a type of node. The instance of the directed graph can also include other instances of other nodes directly or indirectly related to the instances of the transaction IDs.

FIG. 5 shows a table 500 illustrating embodiments of nine example metapaths. The nine example metapaths 501-509 can be visualized through the nodes and links shown in FIG. 4. In general, a metapath corresponds to a path including a sequence of nodes and links within a heterogeneous network scheme. Different metapaths can represent different relationships between different linked nodes. Accordingly, diverse relationships between transactions can be described by a set of metapaths.

In FIG. 5, the nine example metapaths 501-509 start and end at transaction nodes. In the nine example metapaths 501-509, the starting transaction node can indicate a first transaction while the ending transaction node can indicate a different transaction. Some metapaths, such as metapath 501 and 502, begin at a transaction, include one or more links through a series of nodes, and then link to an ending transaction node by way of inverse links through the same types of nodes. Some metapaths, such as metapaths 505 and 506, begin at a transaction, include one or more links through a series of nodes, and then link back by way of different inverse links through different types of nodes. A link denoted with $^{-1}$ indicates an inverse relationship. As an example, metapath 508 denotes a composite relationship between transactions where "containsItem$^{-1}$" represents the inverted relation of "containsItem." Metapath 508 indicates transactions containing items that belong to the same game title. Different metapaths can represent different relationships between linked nodes. Accordingly, diverse relationships between transactions can be described by a set of metapaths.

Initially, the metapaths for a heterogeneous network can be determined in different ways. In some embodiments, the links and metapaths can be manually determined. For example, an IP address might have a correlation with a fraudulent activity, so IP addresses can be nodes in the scheme, and "tranIP" can be a link from a transaction to an IP address node. However, in some embodiments, metapaths can be automatically determined based on the available data extracted from records. In some embodiments, the metapaths can be determined using a breadth-first search, a depth-first search, or other search technique. In some embodiments, the determined metapaths can be used. In some embodiments, the metapaths can be filtered to identify metapaths that can better determine fraudulent characteristics of a transaction. In some embodiments, the metapaths can be filtered based on a length of the path (for example, 5 or fewer nodes, 10 or fewer nodes, 7 or fewer links). After some simulations have been run, P-values of metapaths can be determined. For computational efficiency, metapaths with valuable discriminatory ability can continue to be used, while metapaths with poor discriminatory ability can be removed. In some embodiments, nodes and links can be removed based on the calculated P-value.

In FIG. 4, the directed graph 400 shows examples of both many-to-one links and many-to-many links. The many-to-one links are illustrated with crow's feet on one side of the link, while the many-to-many links are illustrated with crow's feet on both sides of a link.

Some links, such as the "byUser" link 402, can be many-to-one links. This is because many different transactions can be initiated by the same user. In the illustrated embodiment one transaction cannot be made by multiple users. For example, a first video game can be purchased in by a user in a first transaction. Later, that user may purchase another video game in a second transaction. However, a video game cannot be simultaneously purchased by two separate users in a single transaction in the depicted scheme. Nonetheless, other embodiments may use different schemes (for example, a chain-of-title fraud detection system for property transactions may support real property being purchased jointly by multiple people, or a different gaming platform may allow two users to make a single transaction).

Some links, such as the "containsItem" link 421, can be a many-to-many link. According to the embodiment shown in FIG. 4, a single transaction can contain many different types of items. For example, a single transaction can include a purchase of a video game and a purchase of virtual currency. Likewise, the reverse relationship is also true: an item can be purchased in many different transactions. For example, a video game might be bought by 50 different users who made 50 different transactions.

Some nodes can be linked together through a plurality of links. For example, the billing node is linked to the country node through two links: the "binCountry" link and the "addrCountry" link. The "binCountry" link indicates a country corresponding to a Bank Identification Number (BIN), while the "addrCountry" link indicates a country corresponding to a billing address.

Fraud Detections System Mathematical Operations

This section provides a description of some mathematical principles that can be utilized by the fraud detection system. A more detailed mathematical description is provided in U.S. Provisional Patent Application No. 62/373,004, filed on Aug. 10, 2016, the disclosure of which (as previously indicated) is incorporated by reference in its entirety for all purposes.

MATHEMATICAL INTRODUCTION. The task of fraud detection in a heterogeneous information network can be mathematically represented as learning a predictive function $f$, where $f:(V, E, X) \to y$. X is a given data matrix where $X=[x_1^T; \ldots ; x_n^T]$ where $x_i \in \Re^d$ is the feature vector of the i-th transaction, and labels $y=[y_1, \ldots, y_n]$ where $y_i=1$ if the i-th transaction is a fraud, otherwise $y_i=0$. However, in some embodiments, $y_i$ can be an intermediary value between 0 and 1 (or any other number range) indicating an intermediate chance that the i-th transaction is fraudulent. The predictive function can be used on a new transaction $x_u$ (typically, with different data that does not completely match any known transaction) in order to identify the label $y_u$. The predictive function $f$ is referred to as a "model," and the predictive function $f$ can include algorithmic and mathematical components.

Mathematically, the directed graph 400 can be represented as directed graph $G=(V, E)$. V denotes the set of nodes involving m node types: $V=V^1 \cup \ldots \cup V^m$, where $V^1= \{v_1^1, \ldots v_{n_1}^1\}, \ldots, V^m=\{v_1^m, \ldots v_{n_m}^m\}$ and $v_p^i$ represents the p-th node of type i. $E=E^1 \cup \ldots \cup E^r \subseteq V \times V$ denotes the set of links between nodes in V involving r link types. Mathematically, a link type k starting from source nodes of type i and ending at target nodes of type j is described by an adjacency matrix $A^k \in \Re^{n_i \times n_j}$ where $A^k[p,q]=1$ if there exists a link in $E^k$ between $v_p^i$ and $v_q^j$, otherwise $A^k[p,q]=0$. This link type can be written as "$V^i \xrightarrow{E^k} V^j$". Generally, transactions nodes are the target entities $V^l$ in fraud detection applications. The number of target entities is denoted as $n=n_l$.

Metapaths can be implemented as a chain of matrix multiplications. A metapath can be denoted as $P= \langle E^{k_1}, \ldots, E^{k_l} \rangle$, where the source node of $E^{k_1}$ is of type s and the target node of $E^{k_l}$ is type t. The semantic meaning of this metapath is mathematically described as $P=A^{k_1} \times \ldots \times A^{k_l} \in \Re^{n_s \times n_t}$. It can be assumed that the strength of connection between $v_p^s$ and $v_q^t$ on such semantics is positively correlated with $P[p,q]$ because $P[p,q]$ is the count of paths connecting $v_p^s$ and $v_q^t$ that follow the sequence of links in P. Accordingly, P and P are used interchangeably when the meaning is clear from the context.

CONTINUING DISCUSSION WITH EXAMPLE. Metapaths and an adjacency matrix will be discussed with respect to example metapath 509 of FIG. 5 (transaction $\xrightarrow{fromSource}$ source $\xrightarrow{fromSource^{-1}}$ transaction), which can be denoted as $P=\langle E^{k_1}, E^{k_2} \rangle$ where $E^{k_1}$ the set of links indicating which source a transaction is from, and $E^{k_2}$ is the inverted relation of $E^{k_1}$. The adjacency matrix of $E^{k_1}$ is denoted as $A^k \in \Re^{n \times n_s}$, where n is the number of transactions (for example, 130,000 transactions in some embodiments, can be greater or fewer in other embodiments). The adjacency matrix of $E^{k_2}$ is denoted as $A^T$. Accordingly, $P=A \times A^T$. It is noted that the inverted relation of a set of links is described by the transpose of the original adjacency matrix rather than the inverse.

Figure 6B:
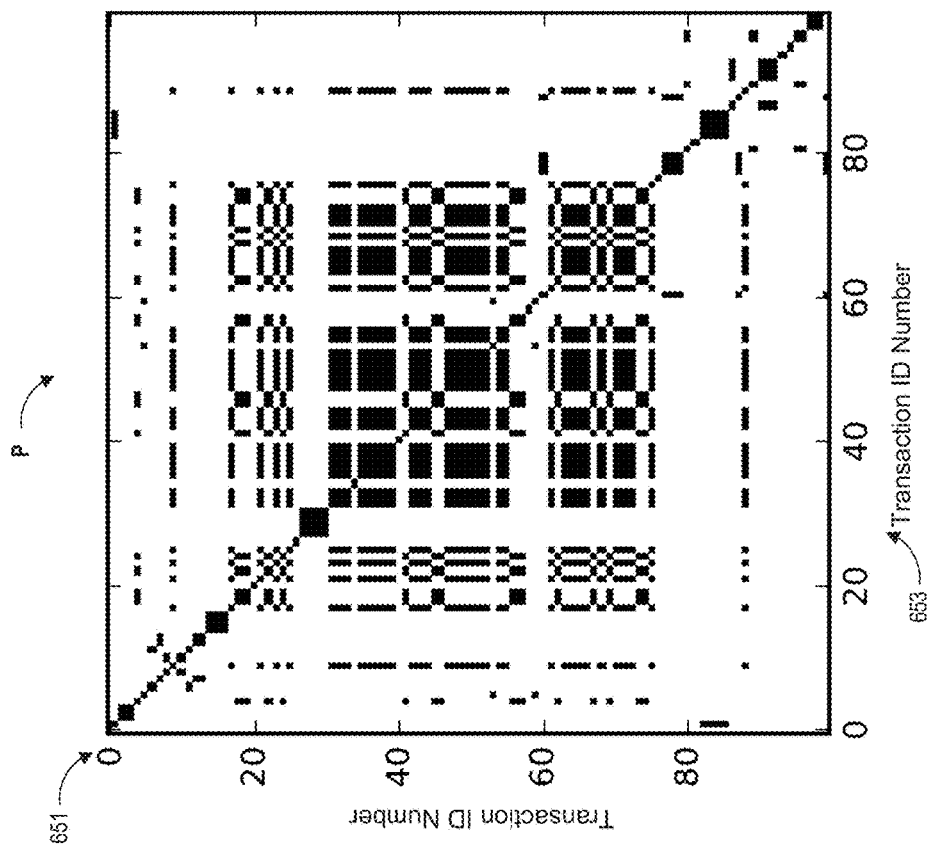
FIG. 6B illustrates an embodiment of a metapath matrix P computed based on adjacency matrix A.
Figure 6A:
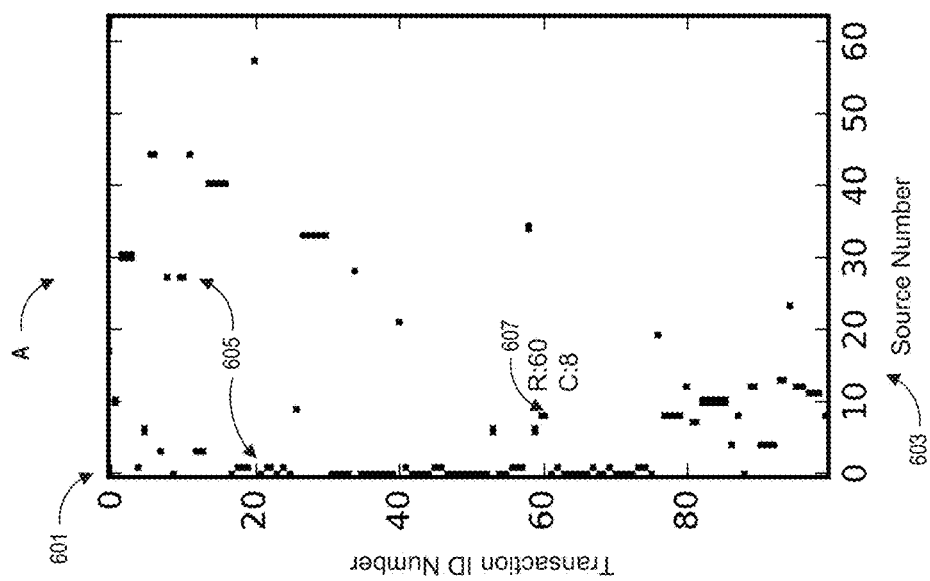
FIG. 6A illustrates an embodiment of an example adjacency matrix A.

Continuing the discussion of example metapath 509, FIG. 6A shows an example adjacency matrix A. The one hundred rows 601 of adjacency matrix A are labeled with transaction identification numbers. The columns 603 of adjacency matrix A are labeled with source numbers. The dark markings (for example, a "1" in the matrix) indicate links between transactions and sources. In the example shown in FIG. 6A, the link is a "fromSource" relationship. For example, adjacency matrix entry 607 indicates that Transaction ID #60 originated from Source #8. The example adjacency matrix A is a mathematically sparse matrix.

Continuing the discussion of example metapath 509, FIG. 6B shows an example metapath matrix P computed based on adjacency matrix A according to $P=A \times A^T$. The one hundred rows 651 of metapath matrix P are labeled with the same transaction identification numbers as labeled in adjacency matrix A. The columns 653 of metapath matrix P are labeled with the same transaction ID numbers as in the columns 601, 651. As can be seen, the computation of metapath matrix P based on adjacency matrix A created a relatively full matrix P. Notably, the size of the matrix in FIG. 6B is the square of the number of transactions. Accordingly, when stored in the memory of a computer, the amount of memory used to represent the data of metapath matrix P is a quadratic function of the number of transactions. Moreover, a lot of the data in metapath matrix P is redundant. The sparsity ratio $1-1/n_s$ of adjacency matrix A is greater than 98% (there is one value per row in the example adjacency matrix A).

EXAMPLE WAY TO CALCULATE Z. Multiplying adjacency matrixes of a metapath in the natural sequence can be inefficient from the time perspective. It can be optimized using dynamic programming in $O(l^3)$ where l is the length of a metapath which is usually very small. However, other difficulties in computing metapaths lie in the space constraint. Turning sparse matrixes into a full metapath can change the space cost from linear to quadratic with respect to the number of transactions. For example, as shown in FIG. 6B, the matrix dimensions are equal to the number of transactions, and the number of elements is the square of the number of transactions. When implemented in a computer system, each matrix element may use a certain amount of memory to be stored. Accordingly, when very large numbers of transactions are processed, the memory used for processing data can increase as a quadratic function of the number of transactions.

To obtain features for fraud detection on transactions, metapaths can be used where the metapaths have the same source node type and target node type (for example, transaction node type). Each transaction may be linked with different numbers of transactions through a metapath. Aggregation functions can be employed to combine the label information of linked transactions in order to derive a fixed number of metapath based features. For example, the weighted label fraction of linked transactions can be used as the feature $z \in \Re^{n \times n}$ for each metapath.

In some embodiments, Equations 1 and 2 can be used to calculate feature z.

$$z = D \times P \times y \quad \text{Equation 1:}$$

$$D[i,i] = 1/\Sigma_j P[i,j] \quad \text{Equation 2:}$$

where $D \in \Re^{n \times n}$ is a diagonal matrix. Accordingly, $z_i$ indicates a ratio of being frauds among transactions that are connected with the i-th transaction through the metapath.

EXAMPLE WAY TO CALCULATE Z IN MANY-TO-ONE CASES. In some embodiments, Equations 3 and 4 can be used to calculate feature z for a metapath P that is a simple metapath. A metapath is a simple metapaths if the metapath is a sequence of many-to-one relationships (for example, indicated by many-to-one links shown in FIG. 4). It is noted that a simple metapath itself is a (composite) many-to-one relationship. For example, the metapath "transaction $\xrightarrow{byBilling}$ billing $\xrightarrow{isAccount}$ account $\xrightarrow{isType}$ type" is a simple metapath. The example metapaths 501-506 and 509 shown in FIG. 5 are simple metapaths according to some embodiments. Equation 3 and 4 are:

$$z = P_1 \times (D_2 \times P_2^T \times y) \quad \text{Equation 3:}$$

$$D_2[i,i] = 1/\Sigma_j P_2[j,i] \quad \text{Equation 4:}$$

where $D_2 \in \Re^{n \times n_t}$ is a diagonal matrix, and where $P=P_1 \times P_2^T$ where $P_1, P_2 \in \Re^{n \times n_t}$. P is decomposed into two parts $P_1$, $P_2$ at the node type t, which can be a node type of the smallest size ($\operatorname{argmin}_i \{|V^i| | V^i \in P\} = t$). In some embodiments, a size other than the smallest size can be used—as long as the number of node elements of the selected type is less than the number of transactions, efficiency can be gained in various amounts. Notably, the feature z can be computed without explicitly computing the metapath matrix P. The weighted label fraction of linked nodes can be obtained without extensive matrix operations, and computing the redundant full matrix of a metapath as an intermediate result can be avoided. In some embodiments, $P_2$ (and/or $P_2^T$) are less likely than P to be redundant. Accordingly, $D_2 \times P_2^T$ can be relatively easily computed because $D_2$ is a diagonal matrix, and furthermore, the next part (multiplying by y) yields a vector rather than a matrix having dimensions equal to the square of the number of transactions. Therefore, $(D_2 \times P_2^T \times y)$ can be relatively easily computed. Computations based on Equation 3 can be completed faster and use less memory than computations based on Equation 1.

EXAMPLE WAY TO CALCULATE Z IN MANY-TO-MANY CASES. In some embodiments, Equations 5, 6, and 7 can be used to calculate feature z for a metapath P that is a complex metapath. A metapath is a complex metapaths if the metapath contains at least one many-to-many relationships (for example, indicated by many-to-many links shown in FIG. 4). It is noted that a complex metapath itself is usually a (composite) many-to-one relationship. For example, the metapaths 507 and 508 of FIG. 5 are complex metapaths. Metapath 508 of FIG. 5 ("transaction $\xrightarrow{containsItem}$ item $\xrightarrow{isTitle}$ title $\xrightarrow{isTitle^{-1}}$ item $\xrightarrow{containsItem^{-1}}$ transaction") can be decomposed into $P_1$ and $P_2$, where $P_1$ is the complex metapath transaction $\xrightarrow{containsItem}$ item $\xrightarrow{isTitle}$ title. Equation 5 and 6 are:

$$z = D_1 \times P_1 \times (D_2 \times P_2^T \times y) \qquad \text{Equation 5:}$$

$$D_1[i,i] = 1/\Sigma_j P_1[i,j] \qquad \text{Equation 6:}$$

$$D_2[i,i] = 1/\Sigma_j P_2[j,i] \qquad \text{Equation 7:}$$

where $D_1 \in \Re^{n \times n}$ is a diagonal matrix, where $D_2 \in \Re^{n_t \times n_t}$ is a diagonal matrix, and where $P = P_1 \times P_2^T$ where $P_1, P_2 \in \Re^{n \times n_t}$. For nontrivial cases (metapath length $l > 1$), P is decomposed into two parts $P_1$, $P_2$ at the node type t, which can be a node type of the smallest size ($\text{argmin}_i \{|V^i| | V^i \in P\} = t$). In some embodiments, a size other than the smallest size can be used, but efficiency can be gained for at least any embodiment where the number of node elements of the selected type is less than the number of transactions. Notably, the feature z can be computed without explicitly computing the metapath matrix P. The weighted label fraction of linked nodes can be obtained without extensive matrix operations, and computing the redundant full matrix of a metapath as an intermediate result can be avoided. In some embodiments, $P_2$ (and/or $P_2^T$) are less likely than P to be redundant. Accordingly, $D_2 \times P_2^T$ can be relatively easily computed because $D_2$ is a diagonal matrix, and furthermore, the next part (multiplying by y) yields a vector rather than a matrix having dimensions equal to the square of the number of transactions. Therefore, $(D_2 \times P_2^T \times y)$ can be relatively easily computed. Computations based on Equation 5 can be completed faster and use less memory than computations based on Equation 1.

Accordingly, features z can be calculated in at least three different ways. The different ways of calculating feature z can be used in different embodiments, and different combinations of ways to calculate feature z can be used in single embodiments.

USING FEATURE Z IN PREDICTION. As stated above, the task of fraud detection in a heterogeneous information network can be mathematically represented as learning a predictive function $f$, where $f:(V, E, X) \to y$. Some classification approaches make an independent and identically distributed (i.i.d.) assumption, and thus the probability of each transaction being fraudulent is inferred independently as $f(x_i) \propto \Pr(y_i = 1 | x_i)$. In addition to given features X, embodiments of predictive function $f$ can include features $\{z^1, \ldots, z^c\}$ that are derived from metapaths $\{P^1, \ldots, P^c\}$ where c is the number of extracted metapaths. Therefore, $f(x_i) \propto \Pr(y_i = 1 | x_i, z_i^1, \ldots, z_i^c)$ can be learned by a machine. In some embodiments, the learned function $f$ does not make an i.i.d. assumption.

In this manner, however, the inference of different transactions is essentially not independent, because metapath based features can include the label information of linked transactions in both training and test sets. Machine learning off can be done in an iterative framework, where the label of a transaction is inferred based on the labels of its linked transactions through its metapath based features. Frameworks can be improved with more efficient ways of computing metapath based features.

In some embodiments, metapaths that are used for feature computation can start from transaction nodes and end at transaction nodes. Each metapath can be decomposed into two parts at the node of the smallest size. Decomposing nodes into nodes of larger sizes than the smallest size can still realize some advantages disclosed herein. Accordingly, in some embodiments, a breadth-first-search can be performed from the transaction nodes ($V^1$). In some embodiments, other types of searches can be performed. In searching, link types "$V^i \xrightarrow{E} V^j$" can be enumerated. If $V^i$ is the current link type and $|V^i| > |V^j|$, a new metapath $P' = P \times A^k$ is added into $S_j$ where P is the current metapaths, and where $S_j$ is the set of downsized metapaths from transaction nodes to the $j^{th}$ type of node. Similarly, if $V^j$ is the current link type and $|V^i| < |V^j|$, a new metapath $P' = P \times A^k$ is added into $S_j$ where P is the current metapath. The search can be expanded from newly added metapaths.

DOWNSIZING METAPATHS. In some embodiments, a search can be completed when all downsized metapaths from $V^i$ to $V^j$ have been found and included in $S_j$. A metapath is a downsized metapath if $n_{k_0} > \ldots > n_{k_l}$, given the node sequence of a metapath $P = \langle V^{k_0}, \ldots, V^{k_l} \rangle$.

In some embodiments, only downsized metapaths are precomputed in an initialization step. The downsized metapaths can be organically combined using Equation 3 or Equation 5 in a feature combination step. Accordingly, redundant metapaths can be automatically avoided because a concatenation of two downsizing metapaths is not a subsequence of one another. Also, the maximal lengths of metapaths can be set without manual tuning. Downsized metapaths can improve computation efficiency and reduce memory usage. The improvements can be even more significant when some links between two nodes in the metapath have a high sparsity ratio (for example, >50%, >75%, >90%, >98%).

Generating a Fraud Detection Model

Figure 7:
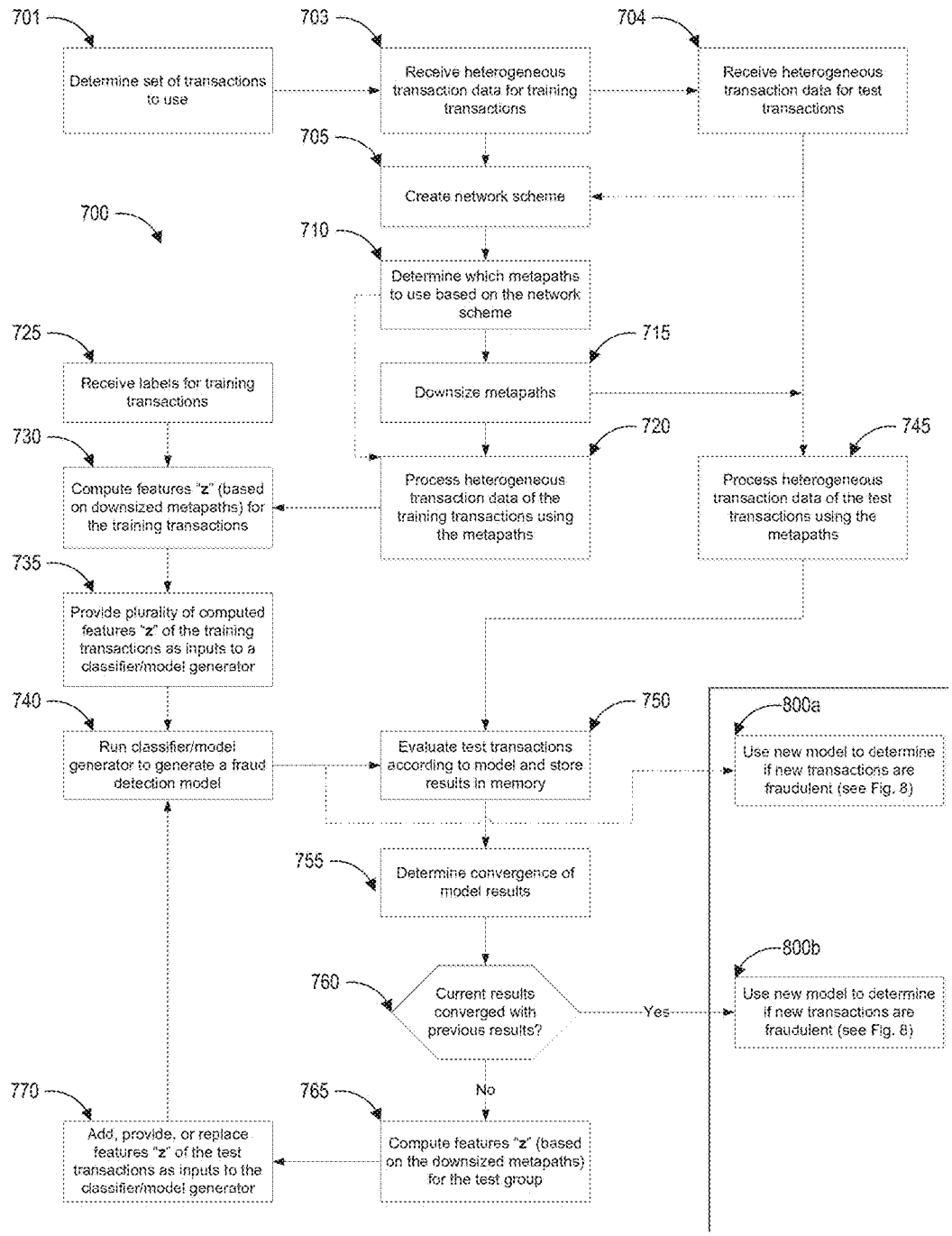
FIG. 7 illustrates an embodiment of a flowchart of an example method for generating a fraud detection model.

FIG. 7 illustrates an embodiment of a flowchart for a process for generating a fraud detection model. The process 700 can be implemented by any system that can generate a fraud detection model. For example, the process 700, in whole or in part, can be implemented by a fraud detection system 109, a model generation system 299, or other computing system. Although any number of systems, in whole or in part, can implement the process 700, to simplify discussion, the process 700 will be described with respect to the model generation system 299.

At block 701, the model generation system can determine a set of transactions to use. The set can include training transactions and test transactions. The set can include transactions from different time periods, for example, the past 3 days, the past 7 days, the past 30 days, and the like. In some embodiments, the set of transactions can have a shared characteristic, for example, all transactions made by a particular user, for a particular source, from a particular IP address, and the like.

At blocks 703 and 704, the model generation system can receive or access the selected set of transactions, where the transactions include heterogeneous transaction data. The data can be received from storage devices storing data related to transaction records (for example, billing records 201, network records 203, and application records 205 as shown in FIG. 2). In some embodiments, heterogeneous transaction data is received for both training transactions and test transactions.

At block 705, the model generation system can create or determine a network scheme. An example network scheme is shown in FIG. 4. The network scheme includes a plurality of links and types of nodes. In some embodiments, the types of nodes can be manually determined based on the available data. For example, if records include billing addresses, then it can be determined that billing addresses will be a type of node in the network scheme. A plurality of nodes types can be determined, and then the nodes can be linked together. In some embodiments, the links are manually determined and manually provided with semantic labels. In some embodiments, the links can be algorithmically generated to connect the nodes. The network scheme can be created based on the heterogeneous transaction data for the training transactions. In some embodiments, the network scheme can additionally or alternatively be created based on the heterogeneous transaction data for the test transactions.

At block 710, the model generation system can determine which metapaths to use based on the network scheme. For example, the model generation system can decide that only metapaths with 5 nodes or fewer will be used. As another example, the model generation system can decide that only metapaths with 7 links or fewer will be used. As another example, the model generation system can decide that some nodes and/or links are unnecessary. For example, item names may have no direct, rational relationships to billing addresses, so there will be no links from item names to billing addresses and no metapaths that include such links. Examples of determined metapaths to use are shown in FIG. 5. For example, it can be determined that the metapath P "transaction $\xrightarrow{fromSource}$ source $\xrightarrow{fromSource'}$ transaction" will be used. In some embodiments, the metapaths that will be used can include both simple metapaths and complex metapaths.

In some embodiments blocks 705 and/or blocks 710 can include performing a breadth-first search, a depth-first search, or other type of search algorithm to identify metapaths and to determine which metapaths to use. The searches algorithm can include limits on how long of a metapath to search for.

At block 715, the model generation system can downsize the metapaths into smaller, downsized metapaths. For example, the model generation system can downsize the metapath P "transaction $\xrightarrow{fromSource}$ source $\xrightarrow{fromSource'}$ transaction" into $P_1$ and $P_2$, where $P_1$ is "transaction $\xrightarrow{fromSource}$ source" and $P_2$ is "source $\xrightarrow{fromSource'}$ transaction." As previously explained, if the metapaths are downsized, then Equation 3 and Equation 5 can be used, allowing more efficient computations and reduced memory consumption in computer systems. Otherwise, Equation 1 can be used. Downsizing some metapaths, such as the example metapath P, can be easily determined because there is only one node that the metapath can be downsized to (the source node).

For other longer metapaths, such as "transaction $\xrightarrow{byBilling}$ billing $\xrightarrow{isAccount}$ account $\xrightarrow{isType}$ type," the underlying data can be analyzed to determine whether the billing node or the account node is the better node at which the longer metapath should be downsized. Regardless of which node is used to downsize a longer metapath, Equations 3 (or Equation 5, where appropriate) can be used. In some embodiments, a metapath P can be decomposed (downsized) into two parts $P_1$, $P_2$ at the node type t, which can be a node type of the smallest size ($argmin_i$ {$|V^i| | V^i \in P$}=t). Determining t, in some cases, can include evaluating the transaction data to count the number of each node type (for example, are there more billing nodes or more account nodes?) and selecting the node type of the smallest size.

At blocks 720 and 745, the model generation system can process heterogeneous transaction data received at block 703 according to the metapaths. In some embodiments, block 710 can proceed to block 720 such that block 715 is skipped; in such cases, Equation 1 can be used at block 730 and 765 when processing data using metapaths that have not been downsized. In some embodiments, block 710 can proceed to block 715, which proceeds to block 720; in such cases, Equation 3 or Equation 5 can be used at block 730 and 765 for processing data using downsized metapaths.

At blocks 720 and 745, processing the transaction data can include determining specific instances of metapaths related to each transaction. For example, a new transaction might have transaction ID 005, originate from IP address 10.10.10.10, and come from source (for example, a game title) "title1" (in math terminology, different titles may be encoded as different numbers "title1"→1 and represented as the sources shown in FIG. 6A). If a downsized metapath $P_1$ "transaction $\xrightarrow{fromSource}$ source" was determined in block 715, then processing the transaction data can include determining the specific instance of metapaths $P_1$ "Transaction ID 005 $\xrightarrow{fromSource}$ "title1." The processed transaction data can be stored in a memory of a computer system (for example, as part of a matrix such as shown in FIG. 6A or other data structure). In some embodiments, the heterogeneous transaction data of both training transactions and test transactions can be processed.

At block 725, the model generation system can receive training labels for the training transactions. The training labels identify a risk that particular training transactions are fraudulent. In some embodiments, the training labels can be provided as a vector y comprising a value, such as a value between 0 and 1, where 1 indicates that a transaction is fraudulent. In some embodiments, the training labels are manually determined based on a manual review of the training data.

At block 730, the model generation system can use the training labels y and the processed transaction data (whether based on full metapaths P, or as downsized metapaths $P_1$ and $P_2$) to compute features z for the training transactions. Equation 1 can be used to compute z for transaction data based on full metapaths P. Equations 3 or 5 can be used to compute z for transactions based on downsized metapaths $P_1$, $P_2$ for simple and complex metapaths, respectively. In some embodiments, a combination of full, simple, and complex metapaths can be used, and z can be calculated based on Equations 1, 3, or 5 for the different metapaths.

At block 735, the model generation system can provide the feature z computed for the training transactions as inputs to a model generator. In some embodiments, the models may be generated based at least in part on, one or more classifiers. Examples of classifiers may include random forest classifier, support vector machines, logistic regression classifiers, factorization machines, linear regression classifiers, and the like.

At block 740, the model generation system can run the model generator (for example, the classifier) and generate a fraud detection model. In some embodiments, the fraud detection model generated at block 740 can be used to detect fraud (for example, as further discussed below with respect to FIG. 8). Accordingly, block 740 can proceed to block 800a after the model has been generated.

In some embodiments, the computer system can iteratively regenerate the model based on test transactions until test results converge. In doing so, the computer can learn and develop better models to use without additional labeled transactions being provided by human input. Accordingly, block 740 can proceed to block 750.

At block 750, the model generation system can evaluate the heterogeneous test transaction data processed at block 745 using the model generated at block 740. Accordingly, the model can determine which of the test transactions are fraudulent or the risk of fraud of each test transaction. For example, each test transaction can be scored from 0 to 1, with 1 indicating a 100% calculated chance of being fraudulent. The results of the test transactions can be stored into a memory as labels $y_{test-N}$ for the test transactions, where "N" indicates the current iteration number. Blocks 755 and 760 can be skipped on a first iteration for the test transactions, and will be discussed further below.

At block 765, the model generation system can use the label vector $y_{test-N}$ of the current iteration and the processed transaction data for the test transactions (for example, from block 745) to compute features $z_{test-N}$ for the test transactions. Equations 1, 3, or 5 can be used to compute features $z_{test-N}$ for the test transactions depending on how the metapaths were determined and/or downsized in blocks 710 and 715.

At block 770, the model generation system can provide or add the features $z_{test-N}$ computed for the test transactions to the model generator or classifier.

The model generation system can run the model generator or classifier again at block 740 to generate a new, iterated fraud detection model based, at least in part, on the features $z_{test-N}$ computed for the test transactions. In some embodiments, the model generator or classifier can generate the new, iterated fraud detection model based, at least in part, on the features $z_{test-N}$ computed for the test transactions and on the features z computed for the training transactions. Then, the next iteration of machine training can begin.

In the next iteration, the heterogeneous test transaction data processed at block 745 can be evaluated by the new, iterated model generated at block 740, and the results can be stored in the memory as a label $y_{test-N+1}$.

At block 755, the model generation system can determine the convergence of model results. For example, it can be determined if $y_{test-N+1}$ is similar to $y_{test-N}$. If the values of $y_{test-N+1}$ and $y_{test-N}$ are similar, then the model can be deemed to be converged. Convergence can be determined in several different ways. For example, each value in the vector $y_{test-N+1}$ can be compared to the corresponding value in $y_{test-N}$, and the differences (or absolute values thereof) can be totaled and compared to a convergence threshold, such that any total differences falling within the convergence threshold are considered to be converged. Other examples can include determining rates of change, counting the number of result that change from fraud to normal or vice versa, and the like. In some embodiments, convergence can be deemed to have occurred after a certain number of iterations (for example, after 10 iterations).

At block 760, if the values have converged, then the model generation system can select the fraud detection model generated in the latest iteration as the model to use for analyzing new transactions (for example, as further discussed below with respect to FIG. 8), and the method can proceed to block 800b. If the values have not converged, then block 760 can proceed to block 765 to continue further iterations.

Some blocks in the flowchart 700 are described with respect to a single metapath, transaction, feature, and the like, but where logical, it will be understood that any such description can be applied to a plurality of metapaths, transactions, features, and the like.

In some embodiments, models can be generated as new transaction records become available. For example, new models can be generated every night to include transaction data from the previous day. The new transaction data can be received, for example, at blocks 703 or 704. FIG. 13 provides example pseudocode for generating a fraud detection model. Some parts of FIG. 13 implement parts of FIG. 7.

Determining Fraudulent Transactions

Figure 8:
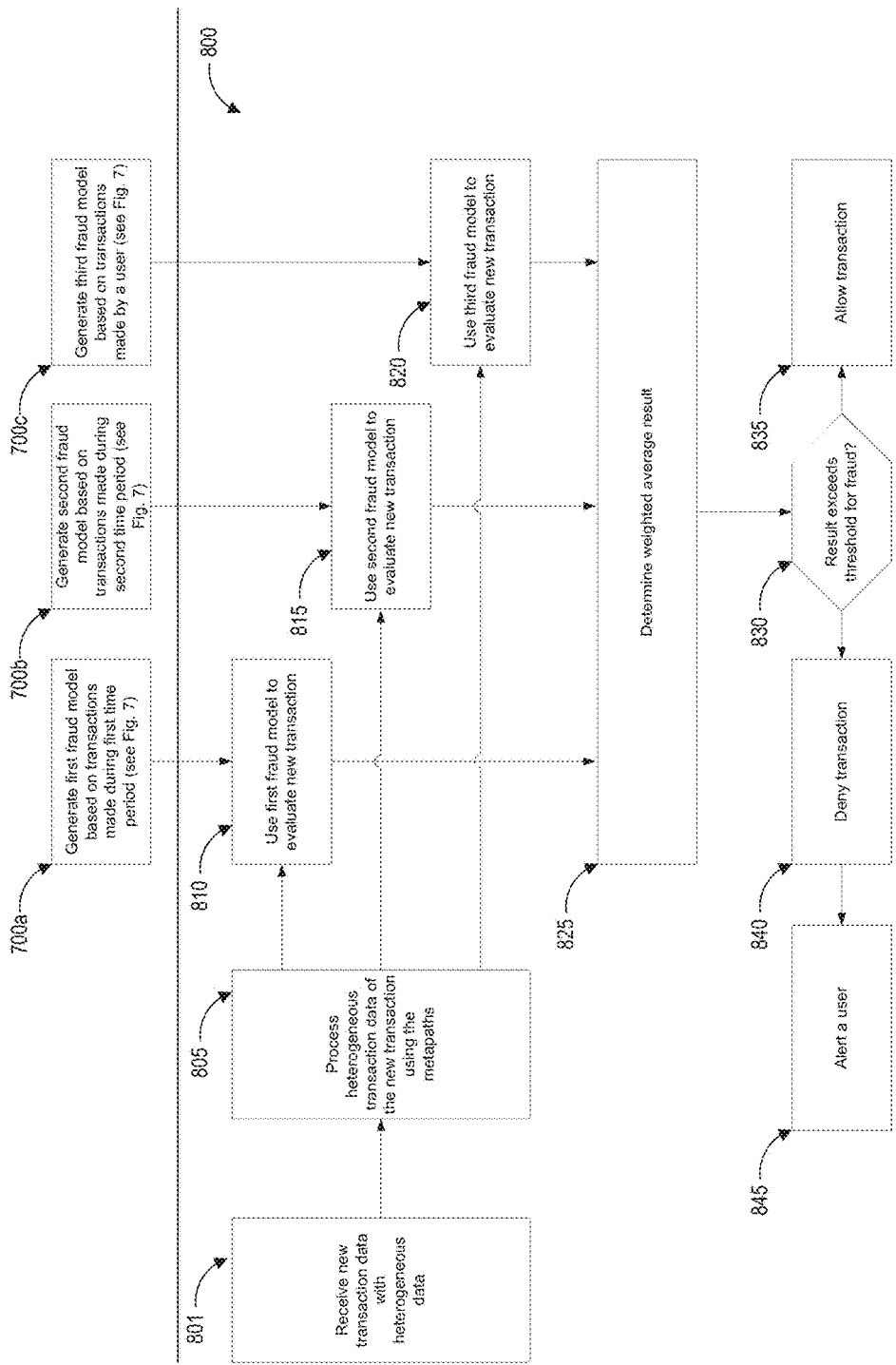
FIG. 8 illustrates an embodiment of a flowchart of an example method for determining the fraud risk of a new transaction.
Figure 9A:
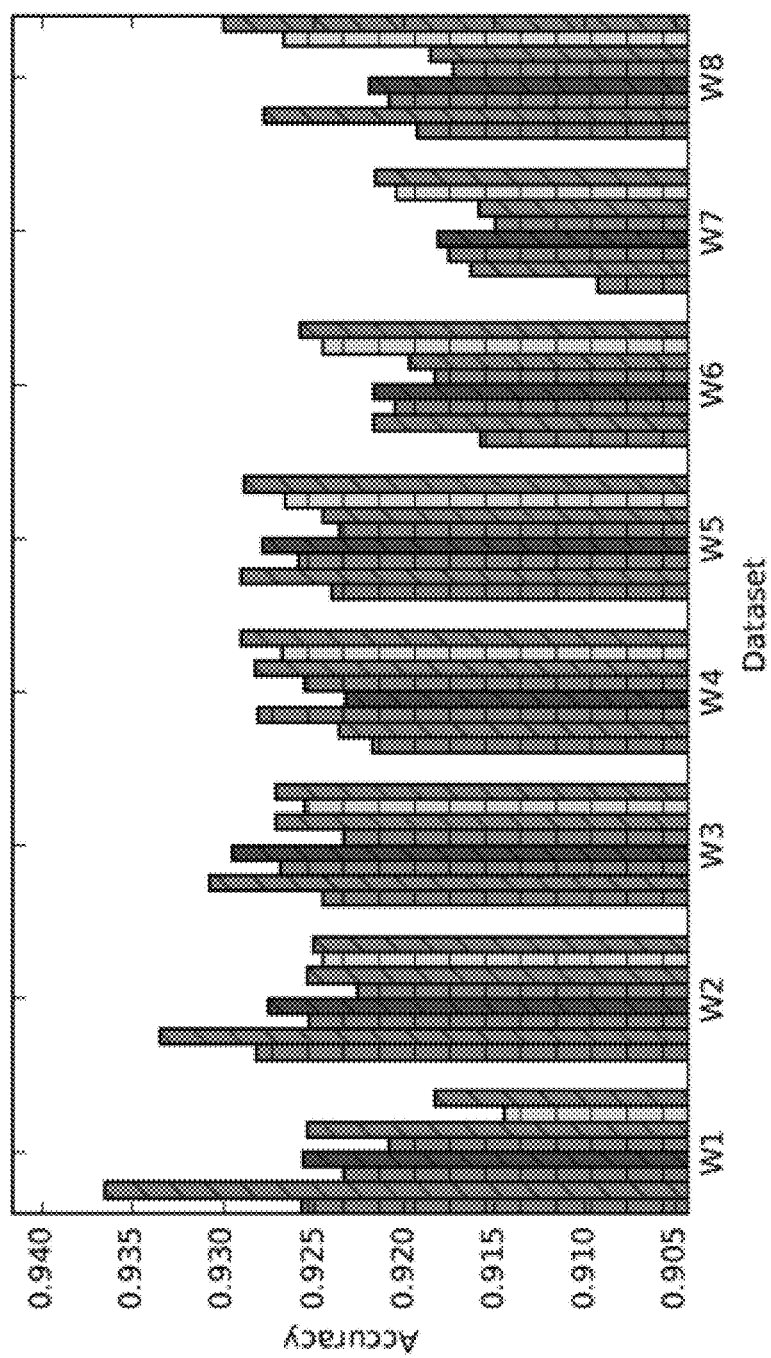
FIGS. 9A, 9B, 9C, and 9D illustrates embodiments of graphs of accuracy, recall, precision, and F-score results, respectively, for a variety of fraud detection classifiers using different sets of data.
Figure 9B:
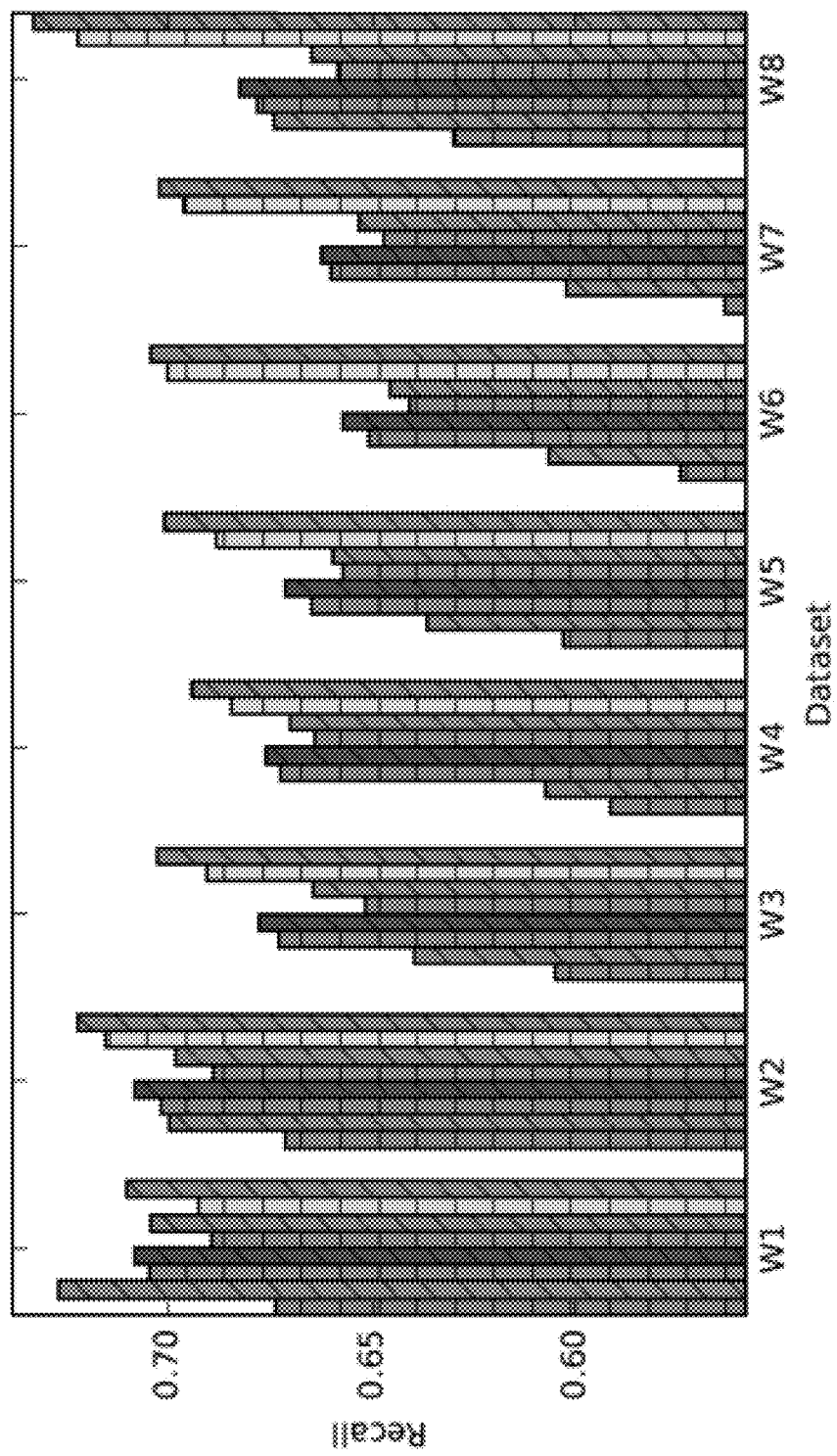
Figure 9C:
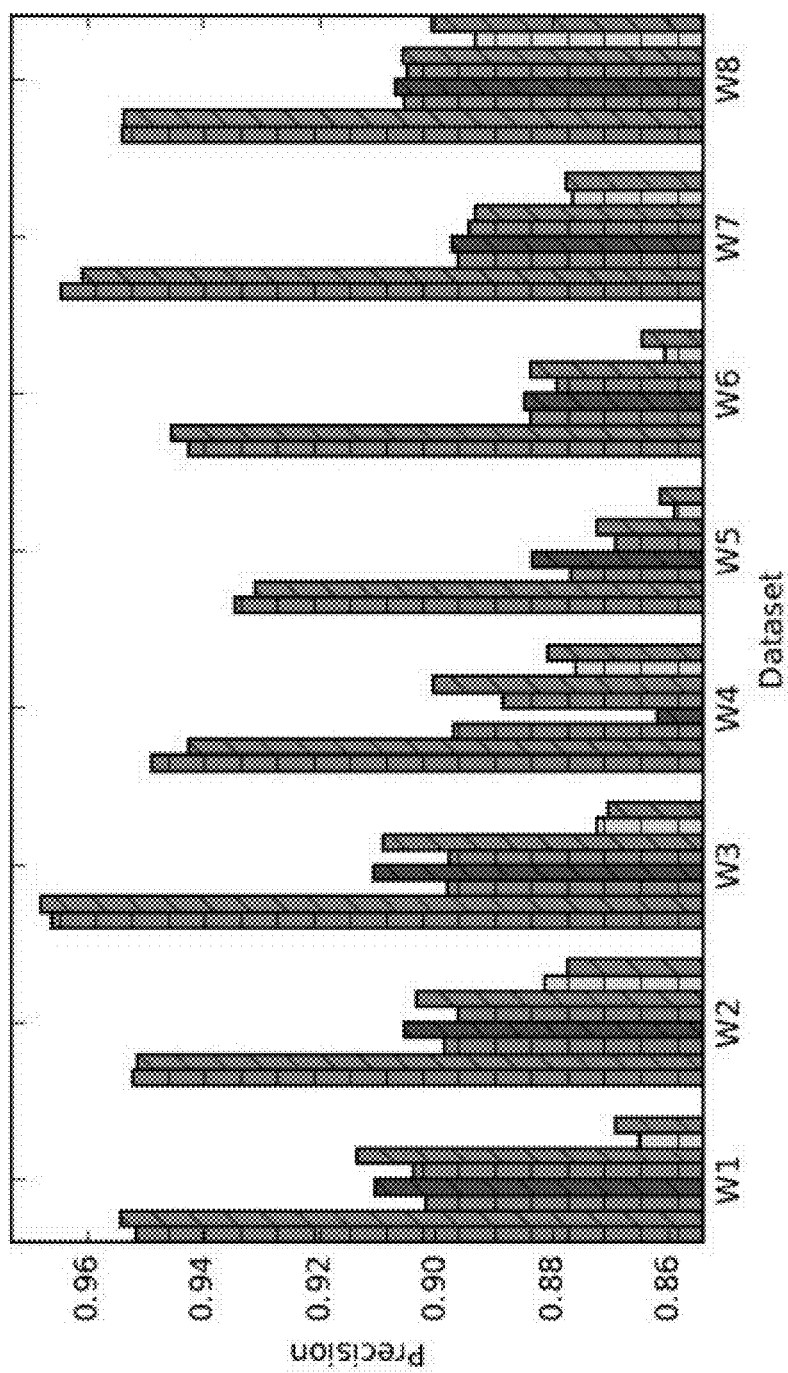
Figure 9D:
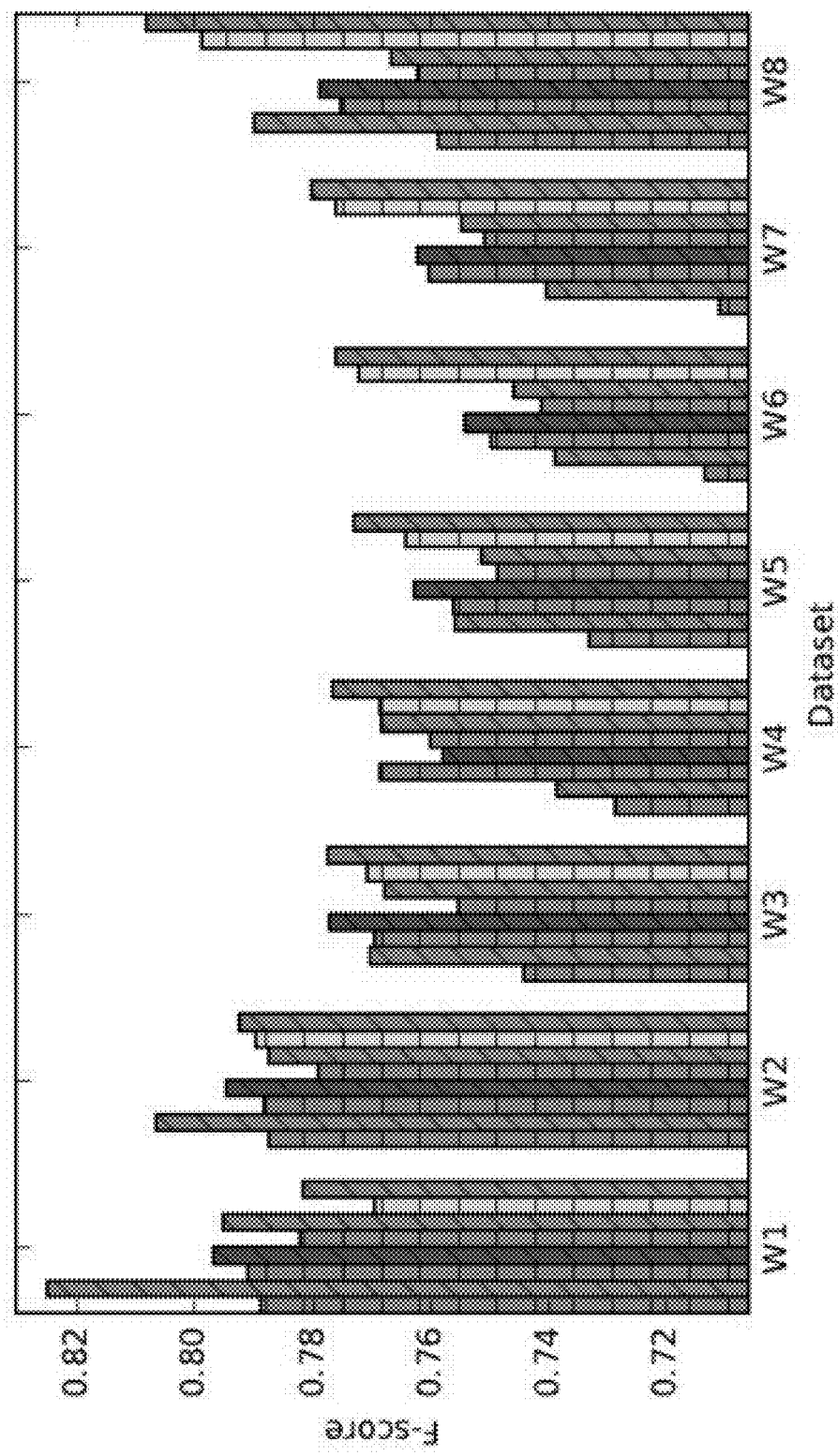

FIG. 8 illustrates an embodiment of a flowchart 800 for an example method for determining the fraud risk of a new transaction. The process 800 can be implemented by any system that can apply a fraud detection model, and receive and analyze transaction data. For example, the process 800, in whole or in part, can be implemented by a fraud detection system 109 or other computing system. Although any number of systems, in whole or in part, can implement the process 800, to simplify discussion, the process 800 will be described with respect to the fraud detection system 109.

At block 801, the fraud detection system can receive a new transaction. The new transaction can be associated with heterogeneous data. For example, the new transaction may have a transaction ID 099, originate from IP address 99.99.99.99, and come from source (for example, a game title) "title1"

At block 805, the fraud detection system can process the heterogeneous data of the new transaction based on metapaths (for example, metapaths or downsized metapaths determined in blocks 710 or 715 of FIG. 7). For example, if a downsized metapaths $P_1$ is "transaction $\xrightarrow{fromSource}$ source" was determined to be used (for example, in block 715), then processing the data for the new transaction can include determining the specific instance of metapath $P_1$ "Transaction ID 099 $\xrightarrow{fromSource}$ "title1."

At blocks 810, 815, and 820, the fraud detection system can evaluate the processed transaction data based on one or more models. As shown in FIG. 8, three different models are used, one in each of block 810, 815, and 820. Each fraud detection model can be generated based on different criteria, for example, different training transactions, different test transactions, different classifiers, different numbers of iterations (or any iterations at all). In the example shown in FIG. 8, the first fraud model used in block 810 was generated based on training transactions made during a first time period (for example, the past 24 hours, past 3 days, past 7 days). In the example shown in FIG. 8, the second fraud model used in block 815 was generated based on training transactions made during a second time period (for example, the past 30 days). In the example shown in FIG. 8, the third fraud model used in block 815 was generated based on all training transactions made by a particular user (for example, the same user associated with the new transaction). Each fraud detection model can generate a fraud score (for example, between 0 to 1, where 1 indicates a 100% calculated chance of fraud). Various embodiments can use different numbers of models to evaluate each transaction (for example, 1 model, 5 models, 10 models).

At block 825, the fraud detection system can aggregate and evaluate the fraud scores. For example, the fraud detection system can average the scores can according to a weighted average calculation and determine a weighted average result.

At block 830, if the weighted average result exceeds a threshold fraud risk number (for example, greater than 0.7), then the fraud detection system can deny the transaction at block 835. This can include, for example, stopping the transaction, sending a communication or warning to a 3$^{rd}$ party processing company such as a credit card company, challenging the user who submitted the transaction to provide additional verification information, triggering alternative forms of payment or payment flows, and the like. At block 845, an alert may be generated and sent. This can include warning a system administrator about the fraudulent transaction, flagging the transaction for review, flagging the transaction for a 3$^{rd}$ party payment system, alerting police or investigators about the fraudulent transaction, alerting the user who initiated the transaction that his transaction is being denied on suspicion of fraud, sending a communication to a registered text number or email address associated with the username who made the transaction, and the like. In some embodiments, the transactions are digital transactions that are processed within a few (for example, 1, 3, 5, 9) seconds or less than a second. In some embodiments, the fraud detection system can operate fast enough to determine a risk score for the transaction based on one or more models and stop a fraudulent electronic transaction faster than the time that an electronic transaction takes to complete.

If at block 830, the weighted average result does not exceed a risk threshold, then the fraud detection system can allow the transaction at block 835. This can include approving the transaction, sending a confirmation to a 3$^{rd}$ party such as a credit card processor, or taking no preventative actions to stop the transaction.

Example Calculation

An example, simple calculation is provided. Heterogeneous training transaction data is provided for three transactions. In transaction #1, the item "item1" was purchased, and "item1" has title "AAA." In transaction #2, the item "item2" was purchased, and "item2" also has title "AAA." Transaction #2 was identified as a fraudulent transaction. In transaction #3, the item "item3" was purchased, and "item 3" has title "BBB."

Based on the available data, the nodes "item," and "title" are determined. A breadth-first search discovers the metapaths P="transaction $\xrightarrow{containsItem}$ item $\xrightarrow{isTitle}$ title $\xrightarrow{isTitle^{-1}}$ item $\xrightarrow{ContainsItem^{-1}}$ transaction." In analyzing the data, there are 3 different items but only two different titles. Accordingly, the metapaths P can be downsized into $P_1$ and $P_2$, where $P_i$ is "transaction $\xrightarrow{containsItem}$ item $\xrightarrow{isTitle}$ title" and $P_2$ is "title $\xrightarrow{isTitle^{-1}}$ item $\xrightarrow{ContainsItem^{-1}}$ transaction."

Processing the training transaction data can include determining:

The containsItem matrix is [1,0,0; 0,1,0; 0,0,1]

| | | | |
|---|---|---|---|
| TXNID 1 | 1 | 0 | 0 |
| TXNID 2 | 0 | 1 | 0 |
| TXNID 3 | 0 | 0 | 1 |
| | Item1 | Item2 | Item3 |

The isTitle matrix is [1,0; 1,0; 0,1]

| | | |
|---|---|---|
| Item1 | 1 | 0 |
| Item2 | 1 | 0 |
| Item3 | 0 | 1 |
| | AAA | BBB |

The $P_1$ matrix is containsItem * isTitle

| | | |
|---|---|---|
| TXNID 1 | 1 | 0 |
| TXNID 2 | 1 | 0 |
| TXNID 3 | 0 | 1 |
| | AAA | BBB |

The $P_2$ matrix is containsItem * isTitle

| | | |
|---|---|---|
| Item1 | 1 | 0 |
| Item2 | 1 | 0 |
| Item3 | 0 | 1 |
| | AAA | BBB |

The P matrix, which does not need to be explicitly calculated, $P_1 \times P_2^T$

| | | | |
|---|---|---|---|
| TXNID 1 | 1 | 1 | 0 |
| TXNID 2 | 1 | 1 | 0 |
| TXNID 3 | 0 | 0 | 1 |
| | TXNID 1 | TXNID 2 | TXNID |

The $D_1$ matrix is a diagonal matrix where $D_1[i,i]=1/\Sigma_j P_1[i,j]$

| | | |
|---|---|---|
| 1 | 0 | 0 |
| 0 | 1 | 0 |
| 0 | 0 | 1 |

The $D_2$ matrix is a diagonal matrix where $D_2[i,i]=1/\Sigma_j P_2[j,i]$

| | |
|---|---|
| 0.5 | 0 |
| 0 | 1 |

The label vector y is [0; 1; 0]

| | |
|---|---|
| TXNID 1 | 0 |
| TXNID 2 | 1 |
| TXNID 3 | 0 |
| | Known Fraud? |

The feature z can be calculated according to Equation 6:
$z = D_1 \times P_1 \times (D_2 \times P_2^T \times y)$.
$z = [0.5; 0.5; 0]$

| | |
|---|---|
| TXNID1 → any linked item → any linked title → any linked item → TXNID1 | 0.5 |
| TXNID2 → any linked item → any linked title → any linked item → TXNID2 | 0.5 |
| TXNID3 → any linked item → any linked title → any linked item → TXNID3 | 0 |

Results from Example Embodiments

The results of some example embodiments are discussed. No result discussed herein is necessarily achieved in a particular embodiment. Different embodiments can have different results, and furthermore, the results can vary based on underlying data.

In some embodiments, labels were determined for about 130,000 transactions made during a period of about one week for use as training transactions. Transactions from a second time period were used as test transactions. The test transactions and labeled training transactions were used to generate fraud detection models. Four different fraud detection models were generated using four different classifiers: random forest, support vector machines, logistic regression, and factorization machines. The results of the classifiers were compared to the same classifiers that explore only the given feature space X, referred to as baselines. Eight different sets of data (W1 through W8) were used.

FIGS. 9A, 9B, 9C, and 9D show graphs of the accuracy, recall, precision, and F-score results, respectively, for a variety of fraud detection classifiers using the eight different sets of data. In each graph, the datasets W1 through W8 are indicated along the x-axis. The respective measurements of accuracy, recall, precision, and F-score are indicated along the y-axis. For each dataset, eight different bars from left to right indicate the results from using a random forest baseline, a random forest according to an embodiment, a support vector machine baseline, a support vector machine according to an embodiment, a logistic regression baseline, a logistic regression according to an embodiment, a factorization machine baseline, and a factorization machine according to an embodiment.

The embodiments using heterogeneous transaction data were usually able to outperform the baselines with multiple choices of base classifiers, on multiple datasets, in multiple evaluation metrics. For example, with random forest on the W1 dataset, accuracy is boosted about 1.17% from 0.9257 to about 0.9366, precision is boosted about 0.28% from about 0.9517 to about 0.9543, recall is boosted about 7.93% from about 0.6737 to about 0.7271, and F-score is boosted about 4.62% from about 0.7889 to about 0.8253. In some embodiments, precision is sacrificed to boost recall and the overall F-score. However, in some embodiments, precision and recall can be improved at the same time.

In some embodiments, c=38 metapaths linking transactions were obtained after pairwise combination at the target node of 17 downsizing metapaths that were extracted from the network scheme in FIG. 4. Improvement from these c=38 metapaths based features were observed compared to the baselines that use d=2000 dimensions. In some embodiments, random forest achieved the best precision while factorization machines obtained the best recall. In some embodiments, an ensemble model can be used with teachings disclosed herein.

Figure 10A:
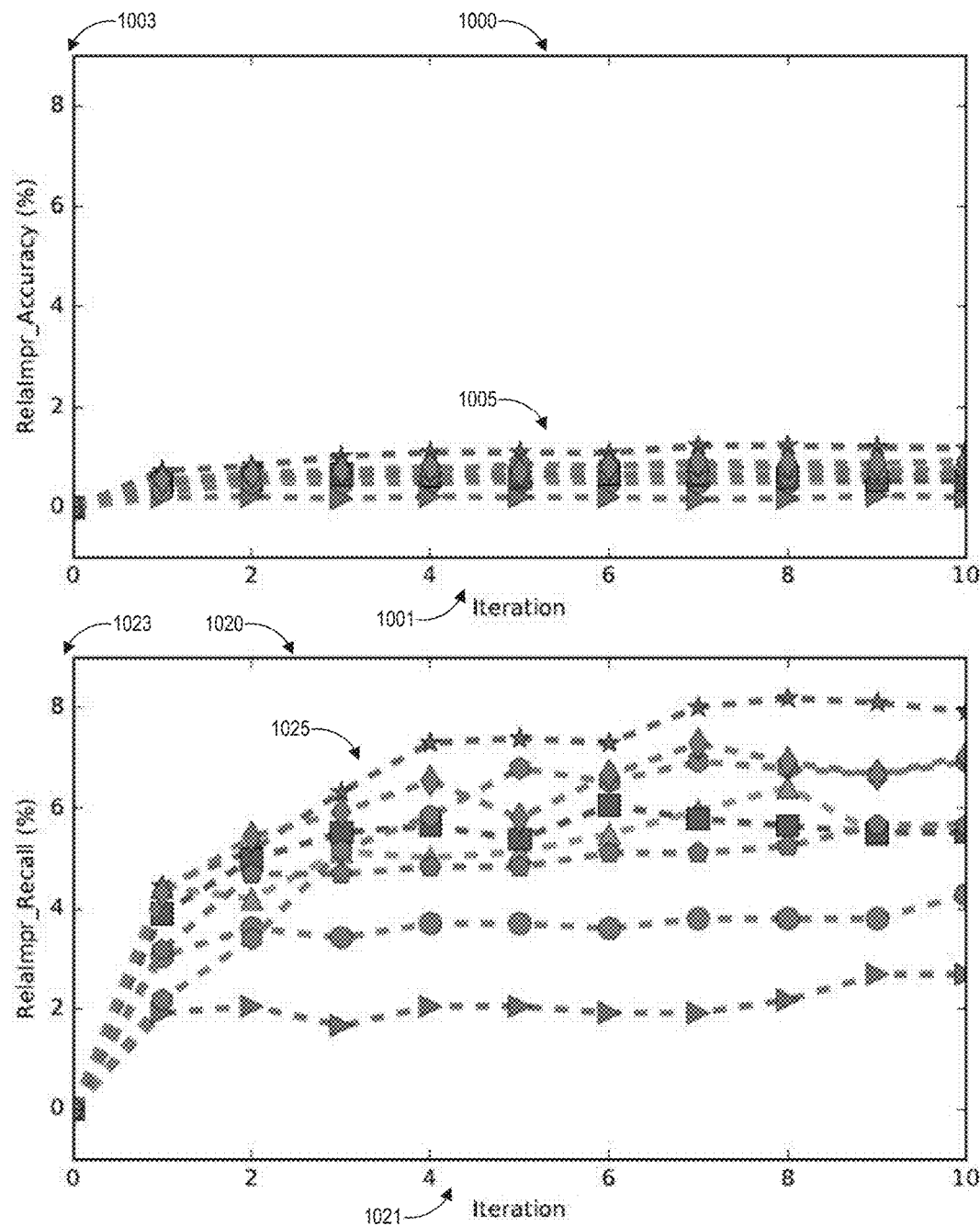
FIG. 10A illustrates embodiment of two graphs showing the effects of different numbers of iterations on accuracy and recall.
Figure 10B:
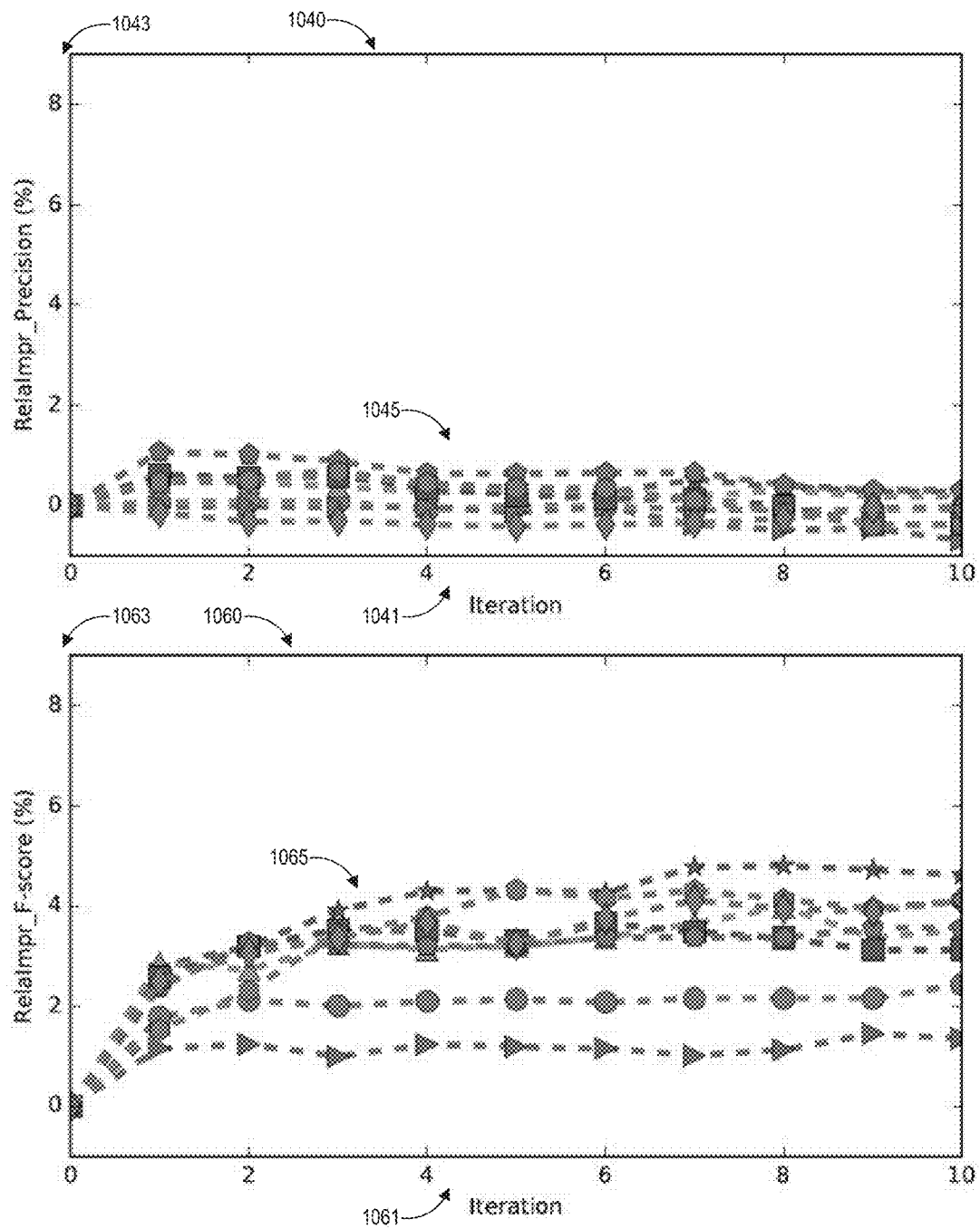
FIG. 10B illustrates an embodiment of two graphs showing the effects of different numbers of iterations on precision and F-score.

FIGS. 10A and 10B show example metrics for models based on the random forest classifier. The improvement of using different numbers of iterations of test transactions is compared to a baseline of zero iterations, so relative improvements are quantified according to the equation $$\left(\frac{\text{metric(iteration)}}{\text{metric(baseline)}} - 1\right) \times 100.$$

FIG. 10A includes a first graph 1000 showing the effects of different numbers of iterations on accuracy. The iteration number is indicated on the x-axis 1001. A relative improvement to accuracy is shown on the y-axis 1003. Eight different lines 1005 indicate results based on eight different datasets.

FIG. 10A includes a second graph 1020 showing the effects of different numbers of iterations on recall. The iteration number is indicated on the x-axis 1021. A relative improvement to recall is shown on the y-axis 1023. Eight different lines 1025 indicate results based on the eight different datasets.

FIG. 10B includes a third graph 1040 showing the effects of different numbers of iterations on precision. The iteration number is indicated on the x-axis 1041. A relative improvement to precision is shown on the y-axis 1043. Eight different lines 1045 indicate results based on the eight different datasets.

FIG. 10B includes a fourth graph 1060 showing the effects of different numbers of iterations on F-score. The iteration number is indicated on the x-axis 1061. A relative improvement to F-score is shown on the y-axis 1063. Eight different lines 1065 indicate results based on the eight different datasets.

As shown in FIG. 10A and FIG. 10B, the accuracy, recall, and F-score can be improved after a few iterations and stabilize after further iterations. In some embodiments, about 1% precision can be reduced, but recall is increased by about 8%, thereby improving accuracy and F-score.

Figure 11:
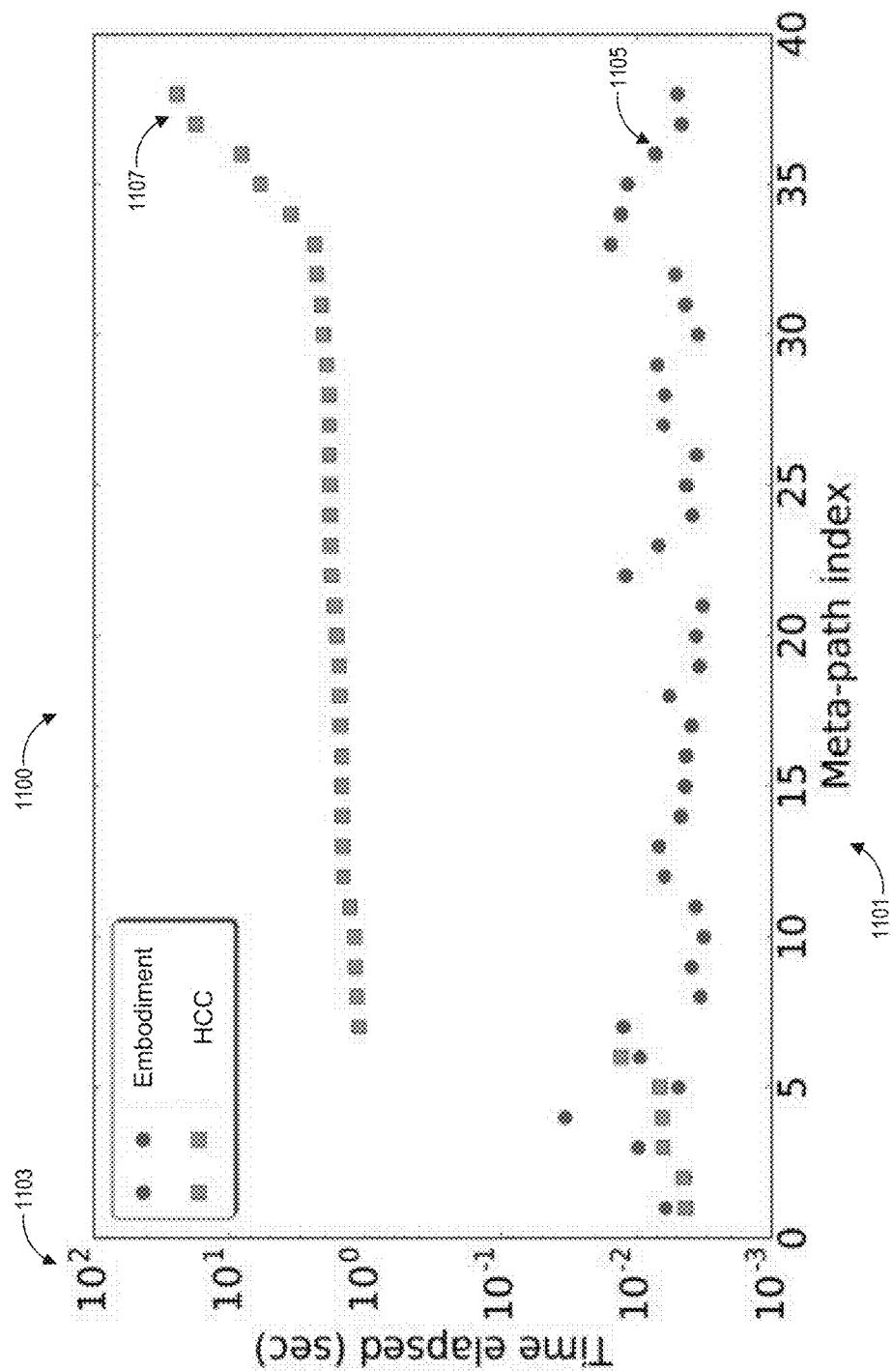
FIG. 11 illustrates an embodiment of an example graph of time used to compute metapath-based features.

FIG. 11 shows an example graph 1100 of time used to compute metapaths based features. The graph 1100 includes an x-axis 1101 representing the index numbers of different metapaths (for example, different metapaths shown in FIG. 5). The graph 1100 includes a y-axis 1103 indicating an amount of time that it took to compute a feature based on a metapath of the particular index. A first set of data points shown as circles 1105 indicates the results of an example embodiment. A second set of data points shown as squares 1107 indicates the results from using a heterogeneous collective classification (HCC) framework. Data for about one week was used. Notably, the time (processing speed) and space cost (memory requirements in a computer system) for HCC are formidable and can prevent smooth and timely operation (or operation at all) in some computer systems.

As shown in the graph 1100, a large time cost discrepancy exists between using the HCC framework and using an example embodiment. Notably, the time axis is a log scale. For some metapaths (for example, with one-to-one relations and low redundancy), the HCC framework did not have a significant discrepancy. However, for some metapaths (for example, at metapath indexes 36, 38), the HCC framework took over $10^1$ seconds while the example embodiment completed in about less than $10^{-2}$ seconds, a discrepancy on the order of $10^3$ (1,000 times faster).

Embodiment of a Computing Device

FIG. 12 illustrates an example of a computing device 1200 according to the present disclosure, which can be used to implement any of the systems and/or run the processes disclosed herein. Other variations of the computing device 1200 may be substituted for the examples explicitly presented herein, such as removing or adding components to the computing device 1200. The computing device 1200 may include a game device, a smart phone, a tablet, a personal computer, a laptop, a smart television, a car console display, a server, and the like. As shown, the computing device 1200 includes a processing unit 1220 that interacts with other components of the computing device 1200 and also external components to computing device 1200. A media reader 1222 is included that communicates with media 1212. The media reader 1222 may be an optical disc reader capable of reading optical discs, such as CD-ROM or DVDs, or any other type of reader that can receive and read data from game media 12. One or more of the computing devices may be used to implement one or more of the systems disclosed herein.

Computing device 1200 may include a separate graphics processor 1224. In some cases, the graphics processor 1224 may be built into the processing unit 1220. In such cases, the graphics processor 1224 may share Random Access Memory (RAM) with the processing unit 1220. Alternatively, or in addition, the computing device 1200 may include a discrete graphics processor 24 that is separate from the processing unit 20. In some such cases, the graphics processor 24 may have separate RAM from the processing unit 20. Computing device 1200 might be a handheld video game device, a dedicated game console computing system, a general-purpose laptop or desktop computer, a smart phone, a tablet, a car console, or other suitable system.

Computing device 1200 also includes various components for enabling input/output, such as an I/O 1232, a user I/O 1234, a display I/O 1236, and a network I/O 1238. I/O 1232 interacts with storage element 1240 and, through a device 1242, removable storage media 1244 in order to provide storage for computing device 1210. Processing unit 1220 can communicate through I/O 1232 to store data, such as game state data and any shared data files. In addition to storage 1240 and removable storage media 1244, computing device 1210 is also shown including ROM (Read-Only Memory) 1246 and RAM 1248. RAM 1248 may be used for data that is accessed frequently, such as when a game is being played or the fraud detection is performed.

User I/O 1234 is used to send and receive commands between processing unit 1220 and user devices, such as game controllers. In some embodiments, the user I/O 1234 can include a touchscreen inputs. The touchscreen can be capacitive touchscreen, a resistive touchscreen, or other type of touchscreen technology that is configured to receive user input through tactile inputs from the user. Display I/O 1236 provides input/output functions that are used to display images from the game being played. Network I/O 1238 is used for input/output functions for a network. Network I/O 1238 may be used during execution of a game, such as when a game is being played online or being accessed online.

Display output signals produced by display I/O 1236 comprise signals for displaying visual content produced by computing device 1200 on a display device, such as graphics, user interfaces, video, and/or other visual content. Computing device 1200 may comprise one or more integrated displays configured to receive display output signals produced by display I/O 1236. According to some embodiments, display output signals produced by display I/O 1236 may also be output to one or more display devices external to computing device 1200, such a display.

The computing device 1200 can also include other features that may be used with a game, such as a clock 1250, flash memory 1252, and other components. An audio/video player or user 1256 might also be used to play a video sequence, such as a movie. It should be understood that other components may be provided in computing device 1200 and that a person skilled in the art will appreciate other variations of computing device 1200.

Program code can be stored in ROM 1246, RAM 1248 or storage 1240 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 1212 (which can be a CD-ROM, cartridge, memory chip, or the like, or obtained over a network or other electronic channel as needed). In general, program code can be found embodied in a tangible non-transitory signal-bearing medium.

Random access memory (RAM) 1248 (and possibly other storage) is usable to store variables and other game and processor data as needed. RAM 1248 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 1248 may be lost when the computing device 10 is turned off or loses power.

As computing device 1200 reads media 1212 and provides an application, information may be read from game media 1212 and stored in a memory device, such as RAM 1248. Additionally, data from storage 1240, ROM 1246, servers accessed via a network (not shown), or removable storage media 1246 may be read and loaded into RAM 1248. Although data is described as being found in RAM 1248, it will be understood that data does not have to be stored in RAM 1248 and may be stored in other memory accessible to processing unit 1220 or distributed among several media, such as media 1212 and storage 1240.

The detailed description of certain embodiments presents various descriptions of specific embodiments. However, the innovations described herein can be embodied in a multitude of different ways, for example, as defined and covered by the claims. In this description, reference is made to the drawings where like reference numbers can indicate identical or functionally similar elements. It will be understood that elements illustrated in the figures are not necessarily drawn to scale. Moreover, it will be understood that certain embodiments can include more elements than illustrated in the drawings and/or a subset of the illustrated elements in a particular drawing. Further, embodiments can incorporate any suitable combination of features from two or more drawings.

In the embodiments described above, apparatus, systems, and methods for fraud detection are described in connection with particular embodiments. It will be understood, however, that the principles and advantages of the embodiments can be used for any other systems, apparatus, or methods. Various embodiments can apply different techniques for fraud detection. Fraud detection models can be generated based on different classifiers, different transactions, different metapaths, different equations, different numbers of iterations, and the like. Some techniques can include using different thresholds to determine convergence, using different thresholds to determine fraud, using different numbers of fraud detection models, using the results of the fraud detection models in different ways (for example, weighted average of results, compare individual results to individual thresholds).

Although certain embodiments are described with reference to fraud detection in a digital gaming platform, it will be understood that the principles and advantages described herein can be used in a variety of applications. Fraud detection has applications in finance, retail, banking, application processing, computer security, network security, authentication, and the like.

In any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not necessarily be construed to imply that these operations are order dependent. The acts of the methods discussed herein can be performed in any order as appropriate. Moreover, the acts of the methods discussed herein can be performed serially or in parallel, as appropriate. Two blocks shown in succession may, in fact, be executed substantially concurrently, or the blocks may sometimes be executed in the reverse order, depending upon the functionality involved. In addition, certain blocks may be omitted in some implementations.

For example, in the flowchart 700, block 715 can be skipped, or it can be combined with block 710. In some embodiments, the flowchart 700 can end at block 800a. In some embodiments, the flowchart 700 can end at block 800b. In some embodiments, the labels in block 725 of flowchart 700, can be received in parallel or together with the heterogeneous transaction data in block 703. In some embodiments, the training transactions and test transactions can be received or processed separately or in parallel. In some embodiments, only one model can be used in the flowchart 800. In some embodiments, the results of individual models can be analyzed as indicated in block 830 instead of analyzing a weighted average.

In some embodiments, the techniques described herein are implemented by one or more special-purpose computing devices. For example, the one or more processors 113 of FIG. 1 and FIG. 2 can be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program non-transitory instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

According to one embodiment, the techniques herein are executed by the one or more processor 113 executing one or more sequences of one or more instructions contained in non-transitory memory 115 or data storage devices 119. Such instructions may be read into main memory 115 from another storage medium, such as another storage device or data storage device 119. Execution of the sequences of instructions contained in memory 115 causes the one or more processor 113 to perform the process steps described herein. In alternative embodiments, hard-wired circuitry may be used in place of or in combination with software instructions.

Memory 115 and data storage device 119 can be non-transitory media and can include volatile, non-volatile, or both volatile and nonvolatile components. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics. Transmission media can also take the form of acoustic or light waves, such as those generated during radio-wave and infra-red data communications.

The memory 115 of FIG. 1 can be a main memory, such as a random access memory (RAM), cache and/or other dynamic storage devices for storing information and instructions to be executed by one or more special-purpose processors 113. Such instructions, when stored in storage media accessible to one or more processors 113, render a computer system into a special-purpose machine that is customized to perform the operations specified in the instructions. Memory 115 also may be used for storing temporary variables (for example, a P matrix) or other intermediate information during execution of instructions to be executed by the one or more special-purpose processors 113. Memory 115 can also be a read only memory (ROM), a magnetic disk, optical disk, or USB thumb drive (Flash drive), or other static storage device for storing static information and instructions.

The I/O devices 117 of FIG. 1 can generate physical manifestations of alerts when fraudulent transactions are detected. These can include visual notifications, audio notifications, and the like. Furthermore, the fraud detection system can interrupt transactions that would otherwise complete, effectively stopping a fraudulent theft from occurring.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. The term "based on," as generally used herein, encompasses the following interpretations of the term: solely based on or based at least partly on. All numerical values provided herein are intended to include similar values within a measurement error.

Moreover, conditional language used herein, such as, among others, "can," "could," "might," "may," "for example," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein can be embodied in a variety of other forms. Furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A fraud detection computing system comprising:
   a fraud detection data store configured to store a fraud detection model generated based at least in part on a metapath including a plurality of heterogeneous data nodes associated with transaction data and also based at least in part on a feature vector indicative of chances that a plurality of transactions were fraudulent; and
   a fraud detection server including one or more processors in electronic communication with a transaction processing system and with the fraud detection data store;
   wherein the fraud detection computing system is configured to:
      access transaction data for an electronic transaction from the transaction processing system, wherein the electronic transaction comprises transaction data including a transaction identifier and heterogeneous data values associated with the plurality of heterogeneous data nodes;
      during processing of an electronic transaction,
         analyze the transaction data using the fraud detection model;
         determine a fraud detection indicator based at least in part on an output of the fraud detection model, the fraud detection indicator indicating a chance that the electronic transaction is fraudulent;
         based on a determination that the fraud detection indicator exceeds a fraud detection threshold, generate instructions for the transaction processing system to cancel the electronic transaction; and
         provide the instructions to cancel the electronic transaction to the transaction processing system before completion of the electronic transaction;
   wherein, to iteratively improve the fraud detection model, the fraud detection computing system is configured to:
      evaluate a plurality of test transactions using the fraud detection model to generate a plurality of risk scores associated with the test transactions;
      determine a test feature vector based at least in part on the plurality of test transactions and the plurality of risk scores associated with the test transactions; and
      regenerate the fraud detection model based at least in part on the test feature vector.

2. The fraud detection computing system of claim 1, wherein the fraud detection system is configured to access the transaction data, analyze the transaction data, and provide the instructions to cancel the electronic transaction to the transaction processing system is completed in less than five seconds, and wherein the fraud detection model is generated based, at least in part, on data from 10,000 electronic transactions.

3. The fraud detection computing system of claim 1, wherein the fraud detection server is further configured to analyze the transaction data for the electronic transaction using two or more fraud detection models, wherein each of the two or more fraud detection models is based on historical data over a defined period of time, wherein the defined period of time for each fraud detection model is different.

4. The fraud detection computing system of claim 3, wherein the fraud detection indicator is an aggregate fraud detection indicator, and the fraud detection server is further configured to aggregate outputs from each of the two or more fraud detection models and generate the aggregate fraud detection indicator based on an analysis of the aggregated outputs when determining the fraud detection indicator.

5. The fraud detection computing system of claim 1, wherein the fraud detection server is further configured to compare a plurality of test scores generated by a fraud detection model of a current iteration to a plurality of test scores generated by a fraud detection model of a previous iteration when iteratively improving the fraud detection model.

6. The fraud detection computing system of claim 1, wherein the feature vector is determined based, at least in part, on a first downsized metapath generated from the metapath and a second downsized metapath generated from the metapath.

7. A computer-implemented method for stopping fraudulent electronic transactions, the method comprising:
   under control of a computing device comprising a hardware processor configured to execute software instructions:
      accessing, by a fraud detection server, data for an electronic transaction from a transaction processing system, wherein the electronic transaction comprises transaction data including a transaction identifier and data values;
      during processing of the electronic transaction,
         analyzing the transaction data for the electronic transaction using a fraud detection model, wherein the fraud detection model is generated based at least in part on a metapath comprising links between heterogeneous data nodes and a feature vector determined based, at least in part, on a metapath and on a plurality of historical transaction records;
         determining a fraud detection indicator based, at least in part, on an output of the fraud detection model;

based on a determination that the fraud detection indicator exceeds a fraud detection threshold, generating instructions for the transaction processing system to cancel the electronic transaction; and providing the instructions to cancel the electronic transaction to the transaction processing system before completion of the electronic transaction; and iteratively improving the fraud detection model by:
evaluating a plurality of test transactions using the fraud detection model to generate a plurality of risk scores associated with the test transactions;

determining a test feature vector based at least in part on the plurality of test transactions and the plurality of risk scores associated with the test transactions; and regenerating the fraud detection model based at least in part on the feature vector and on the test feature vector.

8. The method of claim 7, wherein accessing the transaction data, analyzing the transaction data, and providing the instructions to cancel the electronic transaction to the transaction processing system is completed in less than five seconds, wherein the transaction data is analyzed against at least 10,000 transactions.

9. The method of claim 7, further comprising analyzing the transaction data for the electronic transaction using two or more fraud detection models, wherein each of the fraud detection models is based on historical data over a defined period of time, wherein the defined period of time for each fraud detection model is different.

10. The method of claim 9, wherein the fraud detection indicator is an aggregate fraud detection indicator, and determining a fraud detection indicator further comprises aggregating outputs from each of the two or more fraud detection models and generating the aggregate fraud detection indicator based on an analysis of the aggregated outputs.

11. The method of claim 7, wherein iteratively improving the fraud detection model comprises comparing a plurality of test scores generated by a fraud detection model of a current iteration to a plurality of test scores generated by a fraud detection model of a previous iteration.

12. The method of claim 7, wherein the fraud detection model is generated, based at least in part, on the feature vector generated, based at least in part on a first downsized metapath generated from the metapath and on a second downsized metapath generated from the metapath.

13. A non-transitory computer readable medium comprising computer-executable instructions for fraud detection that, when executed by a computer, causes the computer to implement a method comprising:

accessing, by a fraud detection server, data for an electronic transaction from a transaction processing system, wherein the electronic transaction comprises transaction data including a transaction identifier and data values associated with a plurality of heterogeneous data nodes;

during processing of the electronic transaction,
analyzing the transaction data for the electronic transaction using a fraud detection model, wherein the fraud detection model is generated based at least in part on a metapath comprising links between a plurality of heterogeneous data nodes and also on a feature vector determined based, at least in part, on the metapath and on a plurality of historical transaction records;

determining a fraud detection indicator based at least in part on an output of the fraud detection model;

based on a determination that the fraud detection indicator exceeds a fraud detection threshold, generating instructions for the transaction processing system to cancel the electronic transaction; and providing the instructions to cancel the electronic transaction to the transaction processing system before completion of the electronic transaction; and iteratively improving the fraud detection model by:
evaluating a plurality of test transactions using the fraud detection model to generate a plurality of risk scores associated with the test transactions;

determining a test feature vector based at least in part on the plurality of test transactions and the plurality of risk scores associated with the test transactions; and regenerating the fraud detection model based at least in part on the feature vector and on the test feature vector.

14. The non-transitory computer readable medium of claim 13, wherein accessing the transaction data, analyzing the transaction data, and providing the instructions to cancel the electronic transaction to the transaction processing system is completed in less than five seconds, and wherein the transaction data is analyzed against at least 10,000 historical transaction records.

15. The non-transitory computer readable medium of claim 13, wherein the computer-executable instructions further cause the computer to implement analyzing the transaction data for the electronic transaction using two or more fraud detection models, wherein each of the two or more fraud detection models is based on historical data over a defined period of time, wherein the defined period of time for each fraud detection model is different.

16. The non-transitory computer readable medium of claim 15, wherein the fraud detection indicator is an aggregate fraud detection indicator and the computer-executable instructions further cause the computer to implement aggregating outputs from each of the two or more fraud detection models and generating the aggregate fraud detection indicator based on an analysis of the aggregated outputs when determining a fraud detection indicator.

17. The non-transitory computer readable medium of claim 13, wherein the computer-executable further cause the computer to implement comparing a plurality of test scores generated by a fraud detection model of a current iteration to a plurality of test scores generated by a fraud detection model of a previous iteration when iteratively improving the fraud detection model.

18. The fraud detection computing system of claim 1, wherein the fraud detection system is configured to determine the test feature vector by multiplying at least first matrix, a diagonal matrix, a transposed matrix, and a vector.

19. The method of claim 7, wherein determining the test feature vector includes multiplying at least first matrix, a diagonal matrix, a transposed matrix, and a vector.

20. The non-transitory computer readable medium of claim 13, wherein determining the test feature vector includes multiplying at least first matrix, a diagonal matrix, a transposed matrix, and a vector.

* * * * *

UNITED STATES PATENT AND TRADEMARK OFFICE
CERTIFICATE OF CORRECTION

PATENT NO. : 10,460,320 B1
APPLICATION NO. : 15/351307
DATED : October 29, 2019
INVENTOR(S) : Cao et al.

Page 1 of 1

It is certified that error appears in the above-identified patent and that said Letters Patent is hereby corrected as shown below:

In the Specification

In Column 11, Line 13 (Approx.), change "$v_q^i$," to --$v_q^j$,--.

In Column 11, Line 16 (Approx.), change "$V^l$" to --$V^1$--.

In Column 11, Line 18 (Approx.), change "$n=n_l$." to --$n=n_1$.--.

In Column 12, Line 31, change "$Z\mathcal{E}\mathfrak{R}^{n\times n}$" to --$z \in \mathfrak{R}^{n\times n}$--.

In Column 14, Line 31, change "$P'=P\times A^k$" to --$\mathbf{P'} = \mathbf{P} \times \mathbf{A}^{k^T}$--.

In Column 18, Line 41 (Approx.), change ""title1"" to --"title1".--.

In Column 19, Line 63 (Approx.), change "$P_i$" to --$P_1$--.

In Column 20, Line 42 (Approx.), change "TXNID" to --TXNID 3--.

In the Claims

In Column 30, Line 47 (Approx.), Claim 17, after "computer-executable" insert --instructions--.

Signed and Sealed this
Eighth Day of December, 2020

Andrei Iancu
*Director of the United States Patent and Trademark Office*